US008358679B2

(12) United States Patent
Zeitler et al.

(10) Patent No.: US 8,358,679 B2
(45) Date of Patent: Jan. 22, 2013

(54) RELAY STATION FOR A MOBILE COMMUNICATION SYSTEM

(75) Inventors: Georg Zeitler, Munich (DE); Ralf Koetter, Munich (DE); Gerhard Bauch, Munich (DE); Joerg Widmer, Munich (DE)

(73) Assignee: NTT DoCoMo, Inc., Tokyo (JP)

( * ) Notice: Subject to any disclaimer, the term of this patent is extended or adjusted under 35 U.S.C. 154(b) by 480 days.

(21) Appl. No.: 12/642,987

(22) Filed: Dec. 21, 2009

(65) Prior Publication Data

US 2010/0157878 A1 Jun. 24, 2010

(30) Foreign Application Priority Data

Dec. 23, 2008 (EP) .................... 08022423

(51) Int. Cl.
*H04B 3/36* (2006.01)
(52) U.S. Cl. ....................................... 375/211
(58) Field of Classification Search .................. 375/211
See application file for complete search history.

(56) References Cited

U.S. PATENT DOCUMENTS

| 2001/0020285 | A1 | 9/2001 | Fujiwara et al. | |
|---|---|---|---|---|
| 2006/0056338 | A1 | 3/2006 | Abe et al. | |
| 2007/0149135 | A1* | 6/2007 | Larsson et al. | 455/67.13 |
| 2009/0022249 | A1* | 1/2009 | Aizawa | 375/340 |
| 2009/0036051 | A1 | 2/2009 | Horiuchi et al. | |
| 2009/0285276 | A1* | 11/2009 | Heikkila | 375/232 |
| 2010/0098194 | A1* | 4/2010 | Reial | 375/341 |

FOREIGN PATENT DOCUMENTS

| JP | 2001-237753 A | 8/2001 |
|---|---|---|
| JP | 2005-521269 A | 7/2005 |
| JP | 2006-148867 A | 6/2006 |
| JP | 2007521705 T | 8/2007 |
| JP | 2009-538559 A | 11/2009 |
| WO | 03/003586 A2 | 1/2003 |
| WO | 2005060283 A1 | 6/2005 |
| WO | 2007/102344 A1 | 9/2007 |
| WO | 2007/136337 A2 | 11/2007 |

OTHER PUBLICATIONS

G. Zeitler, R. Koetter, G. Bauch, and J. Widmer, "Design of network coding functions in multihop relay networks," in Proc. 5th symposium Turbo Codes and Related Topics, 2008.

Sichao Yang; Ralf Koetter: "Network Coding over a Noisy Relay: a Belief Propagation Approach"; Information Theory, 2007. ISIT 2007. IEEE International Symposium on, Jun. 24-29, 2007; pp. 801-804, XP031281965, Nice, France.

(Continued)

*Primary Examiner* — Don N Vo
(74) *Attorney, Agent, or Firm* — Nutter McClennen & Fish LLP; John J. Penny, Jr.; Christina M. Sperry

(57) ABSTRACT

A relay station for being operative in a mobile communication system, comprising a receiver for receiving a radio signal from a source, the radio signal comprising symbols representing an encoded information, the encoded information being based on an encoding rule and comprising payload information and redundancy information. The relay station comprising a soft detector for detecting a symbol from the radio signal to obtain soft information, the soft information comprising information on the symbol and reliability information on the information on the symbol. The relay station further comprising a quantizer for quantizing the soft information to obtain quantized soft information and a transmitter for transmitting an information on the quantized soft information to a destination.

14 Claims, 35 Drawing Sheets

OTHER PUBLICATIONS

Bao and J. Li, "Matching code-on-graph with network-on-graph: Adaptive network coding for wireless relay networks", in Proc. 43rd Ann. Allerton conf. On Communications, Control, and Computing, 2005.

Yingda Chen; Kishore S; Jing Li: "Wireless diversity through network coding"; Wireless Communications and Networking Conference, 2006. WCNC 2006., Apr. 3-6, 2006, pp. 1681-1686, XP031387455, IEEE Las Vegas, NV, USA.

A. Sendonaris, E. Erkip, and B. Aazhang, "Increasing uplink capacity via user cooperation diversity," in Proc. IEEE Int. Symp. On Information Theory, 1998.

R. Ahlswede, N. Cai, S. R. Li, and R. W. Yeung, "Network information flow" IEEE Trans. Inf. Theory, vol. 46, No. 4, pp. 1204-1216, Apr. 2000.

C. Hausl, F. Schreckenbach, I. Oikonomidis, G. Bauch, "Iterative network and channel decoding on a tanner graph," in Proc. 43rd Ann. Allerton Conf. on Commmunications, Control and Computing, 2005.

L. Xiao, T. E. Fuja, J. Kliewer, and D. J. Costello, Jr., "Nested codes with multiple, interpretations," in Proc. 40th Ann. Conf. on Information Sciences and Systems, 2006.

T. M. Cover and A. A. El Gamal, "Capacity theorems for the relay channe," IEEE Trans. Inf. Theory, vol. IT-25, No. 5, pp. 572-584, Sep. 1979.

G. Kramer, M. Gastpar, and P. Gupta, "Cooperative stragegies and capacity theorems for relay networks", IEEE Trans. Inf. Theory, vol. 51, No. 9, pp. 3037-3063, Sep. 2005.

L. Sankaranarayanan, G. Kramer, and N. B. Mandayam, "Hierarchical sensor networks: Capacity bounds and cooperative strategies using the multiple-access relay networks", in IEEE Conf. on Sensor Networks, 2004.

A. D. Wyner and J. Ziv. "The rate-distortion function for source coding with side information at the decoder", IEEE Trans. Inf. Theory, vol. IT-22, No. 1, pp. 1-10, Jan. 1976.

A. Chakrabarti, A. de Baynast, A. Sabharwal, and B. Aazhang, "Half-duplex estimate-and-forward relaying: Bounds and code design," in Proc. IEEE Int. Symp. On Information Theory, 2006, pp. 1239-1243.

N. Tishby, F. C. Pereira, and W. Bialek, "The information bottleneck method," in Proc. 37th Ann. Allerton Conf. on Communications, Control, and Computing, 1999.

E. Ayanoglu, et. al. "Diversity Coding of Transparent Self-Healing and Fault Tolerant Communication Networks", IEEE Transactions on Communications, vol. 41, No. 11, Nov. 1993.

S. ten Brink, "Convergence behavior of iteratively decoded parallel concatenated codes," IEEE Trans. Comm., vol. 49, No. 10, pp. 1727-1737, Oct. 2001.

Y. Li, B. Vucetic, T. F. Wong, and M. Dohler, "Distributed turbo coding with soft information relaying in multihop relay networks," IEEE Journal on Sel. Areas in Comm., vol. 24, No. 11, pp. 2040-2050, Nov. 2006.

R. E. Blahut, "Computation of channel capacity and rate-distortion functions," IEEE Trans. Inf. Theory, vol. It-18, No. 4, pp. 460-473, Jul. 1972.

European Telecommunications Standards Institute, "Universal mobile telecommunications system (UMTS): Multiplexing and channel coding (FDD)," 3GPP TS 125.212 version 3.4.0, Tech. Rep., 2000.

J. Hagenauer, E. Offer, and L. Papke, "Iterative decoding of binary block and convolutional codes," IEEE Trans, Inf. Theory, vol. 42, No. 2, pp. 429-445, Mar. 1996.

European Search Report mailed Dec. 23, 2008 issued in the corresponding European Application EP08022423.

Japanese Office Action issued Oct. 28, 2011 for Application No. 2009-292357 (1 page).

Japanese Office Action for Japanese Application No. 2009-292368 dated Dec. 9, 2010.

Georg Zeitler et al.: "Design of Network Coding Functions in Multihop Relay Networks," Proceedings of the 2008 5th International Symposium on Turbo Codes and Related Topics, Sep. 1, 2008, pp. 249-254.

* cited by examiner

Algorithm 1 Algorithm to compute $p(z|l)$

Input: $p(x,l), \beta, N = |Z|, M$
Initialization: randomly choose $p(z|l)$, $i \leftarrow 0$
while $i \leq M$ do $$p(z) \leftarrow \sum_l p(l) p(z|l)$$

$$p(x|z) \leftarrow \frac{1}{p(z)} \sum_l p(x,l) p(z|l)$$

$$p(z|l) \leftarrow \frac{p(z)}{N(l,\beta)} \exp(-\beta D(p(x|l) || p(x|z)))$$

$i \leftarrow i+1$
end while

FIG 6A

Algorithm 2 Algorithm to compute $p(z|l_1,l_2)$

Input: $p(x_1,x_2,l_1,l_2), \beta, N = |Z|, M$

Initialization: randomly choose $p(z|l_1,l_2)$, $i \leftarrow 0$ while $i \leq M$ do $\quad p(z) \leftarrow \sum_{l_1,l_2} p(l_1,l_2) p(z|l_1,l_2)$ $\quad p(x_1,x_2|z) \leftarrow \dfrac{1}{p(z)} \sum_{l_1,l_2} p(x_1,x_2,l_1,l_2) p(z|l_1,l_2)$ $\quad p(z|l_1,l_2) \leftarrow \dfrac{p(z)}{N(l_1,l_2,\beta)}$ $\quad\quad\quad \exp\{-2\beta D(p(x_1,x_2|l_1,l_2) || p(x_1,x_2|z))$
$\quad\quad +\beta D(p(x_1|l_1) || p(x_1|z)) + \beta D(p(x_1|l_1) || p(x_1|z))\}$ $\quad i \leftarrow i+1$ end while

FIG 7A

RELAY STATION FOR A MOBILE COMMUNICATION SYSTEM

BACKGROUND OF THE INVENTION

The present invention is in the field of wireless communication in a mobile communication system using relay stations.

Conventional relaying concepts comprise, for example, standard relaying methods as amplify-and-forward relaying, decode-and-forward relaying, respectively. While amplify-and-forward relaying has low delay on the expense of noise amplification, decode-and-forward relaying causes a processing delay at the relay station, due to decoding. Moreover, decoding errors at the relay station may have detrimental effects on decoding at the destination.

The designated purpose of a relay station in wireless networks is to facilitate the transmission of other users within the same cell, where one important benefit is provision of cooperative diversity as shown by A. Sendonaris, E. Erkip, and B. Aazhang, "Increasing uplink capacity via user cooperation diversity," in Proc. IEEE Int. Symp. on Information Theory, 1998. While the concept of network coding as shown by R. Ahlswede, N. Cai, S. R. Li, and R. W. Yeung, "Network information flow," IEEE Trans. Inf. Theory, vol. 46, no. 4, pp. 1204-1216, April 2000 was originally developed to increase throughput in wireline networks, the application of network coding to wireless networks has been shown to effectively combat the effects of the fading channels shown by X. Bao and J. Li, "Matching code-on-graph with network-on-graph: Adaptive network coding for wireless relay networks," in Proc. 43rd Ann. Allerton Conf. on Communications, Control, and Computing, 2005, C. Hausl, F. Schreckenbach, I. Oikonomidis, G. Bauch, "Iterative network and channel decoding on a tanner graph," in Proc. 43rd Ann. Allerton Conf. on Communications, Control, and Computing, 2005 and Y. Chen, S. Kishore, and J. Li, "Wireless diversity through network coding," in Proc. IEEE Wireless Communications and Networking Conf., 2006 and L. Xiao, T. E. Fuja, J. Kliewer, and D. J. Costello, Jr., "Nested codes with multiple interpretations," in Proc. 40th Ann. Conf. on Information Sciences and Systems, 2006, thereby providing cooperative diversity.

A common assumption is that the relay node or relay station can recover the source messages perfectly, thus restricting the investigation to relaying protocols based on the decode-and-forward (DF) as shown by the strategy of T. M. Cover and A. A. El Gamal, "Capacity theorems for the relay channel," IEEE Trans. Inf. Theory, vol. IT-25, no. 5, pp. 572-584, September 1979, G. Kramer, M. Gastpar, and P. Gupta, "Cooperative strategies and capacity theorems for relay networks," IEEE Trans. Inf. Theory, vol. 51, no. 9, pp. 3037-3063, September 2005, and L. Sankaranarayanan, G. Kramer, and N. B. Mandayam, "Hierarchical sensor networks: Capacity bounds and cooperative strategies using the multiple-access relay network," in IEEE Conf. on Sensor Networks, 2004, or to the strategy that the relay does not transmit at all if residual errors remain after decoding, provided there exists an error detection scheme at the relay node.

FIG. 13 illustrates a scenario and a radio network which utilizes multi-hop relaying. FIG. 13 shows a source $s_1$ transmitting a symbol or a transmit word $x_1$, which is received by a relay station r and a destination d. FIG. 13 shows a second source $s_2$ transmitting a second symbol or a transmit word $x_2$, which is also received by the relay station r and a destination d. Moreover, the relay station r transmits a symbol $x_r$, which is also received by the destination.

Throughout, the multiple-access relay channel (MARC=Multiple Access Relay Channel) shown in FIG. 13 with two sources $s_1$, $s_2$, one relay r and the destination d will be considered. The network geometry is assumed to be such that the relay is closer to the destination than to the sources, so that the source-relay channel quality is too low to permit reliable decoding at the relay. The relay-destination link, however, can support a higher rate due to its proximity to the destination. For such a scenario, the relay can make use of ideas from network coding as described by R. Ahlswede, N. Cai, S. R. Li, and R. W. Yeung, "Network information flow," IEEE Trans. Inf. Theory, vol. 46, no. 4, pp. 1204-1216, April 2000 to form the log-likelihood ratios (LLRs) of the network coded message $x_1 \oplus x_2$ and transmit these LLRs in an analog manner to the destination to significantly increase the receiver performance, as shown in S. Yang and R. Koetter, "Network coding over a noisy relay: a belief propagation approach," in Proc. IEEE Int. Symp. on Information Theory, 2007.

Other approaches with respect to relaying can be found in A. D. Wyner and J. Ziv, "The rate-distortion function for source coding with side information at the decoder," IEEE Trans. Inf. Theory, vol. IT-22, no. 1, pp. 1-10, January 1976, A. Chakrabarti, A. de Baynast, A. Sabharwal, and B. Aazhang, "Half-duplex estimate-and-forward relaying: Bounds and code design," in Proc. IEEE Int. Symp. on Information Theory, 2006, pp. 1239-1243, N. Tishby, F. C. Pereira, and W. Bialek, "The information bottleneck method," in Proc. 37th Ann. Allerton Conf. on Communications, Control, and Computing, 1999, and G. Zeitler, R. Koetter, G. Bauch, and J. Widmer, "Design of network coding functions in multihop relay networks," in Proc. 5th symposium Turbo Codes and Related Topics, 2008.

In E. Ayanoglu, et. al. "Diversity Coding of Transparent Self-Healing and Fault Tolerant Communication Networks", IEEE Transactions on Communications, Vol. 41, No. 11, November 1993, the authors disclose the concept of network coding, which is illustrated in FIG. 14. FIG. 14 shows a first encoder 1410 coding an information word $u_1$ to a first symbol or transmit word $x_1$, which is transmitted to a relay station 1450 and a destination 1470. Furthermore, FIG. 14 shows a second encoder 1420, which encodes a second information word $u_2$ to a second symbol or transmit word $x_2$, which is also transmitted to the relay station 1450 and the destination 1470. As indicated in FIG. 14 at the relay station 1450, two symbols are received, superimposed by additive white Gaussian noise $n_r$ (AWGN=Additive White Gaussian Noise). Two decoders are operative at the relay station 1450, which are labeled "decoder 1" 1451 and "decoder 2" 1452 in FIG. 14.

Ideally, the two decoders 1451 and 1452 decode the information words $u_1$ and $u_2$. The two decoded information words are then combined as indicated by addition 1453 in FIG. 14 and the combination is encoded by the encoder 1454 shown in FIG. 14. The encoded combined symbol $x_R$ is then transmitted from the relay station 1450 to the destination 1470, where it is superimposed by AWGN $n_B$. Three symbols or receive words are received at the destination 1470, namely $y_1$ from "encoder 1" 1410, $y_2$ from "encoder 2" 1420, and $y_R$ from the relay station 1450. At the destination 1470 joint decoding may be utilized in order to decode the information words $u_1$ and $u_2$. One disadvantage of the concept illustrated in FIG. 14 is the delay, which is associated with decoding the received signal at the relay station 1450 in order to derive the information words and with encoding the combination of said information words again at the relay station 1450.

Another conventional approach is illustrated in FIG. 15. FIG. 15 shows similar components as have been described with respect to FIG. 14, however, at the relay station 1450, instead of combining the decoded information words $u_1$ and $u_2$, a joint encoder 1455 is utilized. The joint encoder 1455 may have the advantage that an increased block length can be used, which may particularly be beneficial for iterative decoding. The joint encoder 1455 may enable increased diversity which may be exploited at the joint decoder at the destination 1470. However, high delays are still involved with decoding the received signals at the relay station and jointly encoding the decoded signals again, especially when increased block lengths are used. Another problem arises from decoding errors at the relay station 1450, which are re-encoded, and therewith extended or forwarded to the destination 1470.

Yet another conventional approach is illustrated in FIG. 16, which shows similar components as have already been introduced with respect to FIGS. 14 and 15. FIG. 16 illustrates the approach of analog transmission from the relay station 1450 to the destination 1470, which may, for example, be implemented at a base station or a NodeB. The main difference with respect to the above explained concepts is that the decoders 1451 and 1452 at the relay station 1450 provide soft information in terms of log likelihood ratios (LLR=Log Likelihood Ratio) of the information words $u_1$ and $u_2$. An equation is shown at the top of FIG. 16, which provides insight into a LLR of a general information word u. In a general case, the information word u may comprise only a single bit, which can take two values, namely +1 or −1. The so-called soft information can be determined by considering the quotient of the probability that the bit equals +1 and the probability that the bit equals −1, which is shown in the equation at the top of FIG. 16.

Taking the logarithm of the quotient linearizes the soft information and maps the quotient from the range of positive real number to the full range of the real numbers. Consequently, taking the sign of the LLR corresponds to a hard decision detector. The magnitude of the LLR corresponds to reliability information.

At the relay station 1450 in FIG. 16, the decoders 1451 and 1452 determine the LLRs of the corresponding information words $u_1$ and $u_2$. Moreover, FIG. 16 shows that the relay station 1450, the LLRs at the output of the second decoder 1452 are provided to an interleaver 1456, which interleaves the LLRs. The interleaved LLRs from the second decoder are then combined by the combiner 1457 before analog transmission is used to transmit information on the combination to the destination 1470. Reliability information, in terms of the LLRs is therewith provided to the joint decoder at the destination 1470. However, long delays still occur at the relay station 1450 in order to determine the soft information by the two decoders 1451 and 1452.

FIG. 17 illustrates the same scenario as FIG. 16, however, the details on the destination or NodeB are provided. As can be seen from FIG. 17, LLRs are determined at the destination 1470 for the three receive signals $y_1$, $y_2$, and $y_R$ by the three detectors 1471, 1472, and 1473. FIG. 17 illustrates the concept of joint iterative decoding. The log likelihood ratio provided by the detector 1471 is, in a first step, provided to a first decoder 1475, in order to determine LLRs on the information word $u_1$. The LLRs provided at the input of the decoder 1475 correspond to a-posteriori knowledge of the transmitted code words. At the output of the decoder 1475, a-priori knowledge on the information word $u_1$ is determined by evaluating the difference of the a-posteriori knowledge and the output of the decoder 1475. The a-priori knowledge is still available in terms of LLRs which can then be combined by the combiner 1476 with the LLRs determined by detector 1473 from the received signal $y_R$ on the combination determined at the relay station 1450.

The combination can, for example, be determined by determining a combined LLR for an XOR-combination of the information words $u_1$ and $u_2$. Subsequently, a derivation of the exact combination will be provided which is indicated by "±". From the a-priori knowledge on the first information word and the LLR on the combination, a-posteriori knowledge on the second information word can be determined, which is de-interleaved by de-interleaver 1477. The de-interleaver 1477 corresponds to the interleaver 1456 at the relay station 1450. The de-interleaved LLR at the output of the de-interleaver 1477 can then be combined with the LLRs detected by detector 1472 from the second receive signal $y_2$, and provided as an input to the second decoder 1478. The second decoder 1478 then provides LLRs on the second information word $u_2$ at its output, from which the a-posteriori knowledge from the detector 1472 and the interleaver 1477 can be deducted for determining a-priori information, which may also be called extrinsic information.

After interleaving 1479, the interleaved LLRs can again be combined with the output of the detector 1473 by combiner 1480. A-posteriori information on the first information word $u_1$ is available at the output of the combiner 1480, which can again be combined with the a-posteriori knowledge at the output of the detector 1471. The above description corresponds to a first iteration loop of the joint iterative decoder, which is similar to the principle of turbo decoding. Multiple iteration loops may be carried out along the lines of the above description in order to determine more reliable information on the information words $u_1$ and $u_2$.

FIG. 18 illustrates the case, where at a relay station 1450 bad or weak radio channels are experienced and accordingly, LLRs are determined, which are equal or close to zero. Consequently, at the destination 1470, the LLRs determined by the detector 1473 equal zero, i.e. only very unreliable information is available. Consequently, the combinations carried out by combiners 1476 and 1480 also yield LLRs, which are zero. Therefore, within the decoder, the LLRs of detector 1473 do not influence the LLRs determined by the detectors 1471 and 1472. In other words, if decoding at the relay station 1450 is very unreliable, decoding at the destination is solely based on the outputs of the detectors 1471 and 1472. The iterative process does not provide any benefits in this case.

FIG. 19 illustrates simulation results on the bit error rate (BER=Bit Error Rate) for the scenario, which is depicted on the left-hand side of FIG. 19. In this scenario two sources 1901 and 1902 transmit signals to a relay station 1903 and a destination 1904. Moreover, on all links signal-to-noise ratios (SNR=Signal-to-Noise Ratio) are given, namely, $SNR_{sr}$ on the links between the sources 1901 and 1902 and the relay station 1903, $SNR_{sd}$ on the links between the sources 1901 and 1902 and the destination 1904, and $SNR_{rd}$ for the link between the relay station 1903 and the destination 1904. On the right-hand side of the FIG. 19, a view chart depicts BER vs. SNR on the links between the sources 1901 and 1902 and the destination 1904. For the simulations, it was assumed that the links are symmetric, i.e. similar SNRs occur on the links of both sources 1901 and 1902 to the relay station 1903. Moreover, for the results depicted on the right-hand side of FIG. 19, it was assumed that $SNR_{sr}$=5 dB and results are shown for different $SNR_{rd}$ between the relay station 1903 and the destination 1904. The results illustrate that significant benefits can be obtained in BER if the signal quality on the link between the relay station 1903 and the destination 1904 increases.

FIG. 20 illustrates similar simulation results. However, for the results in FIG. 20, it was assumed that the SNR on the links between the sources 1901 and 1903, and the relay station 1903 was 0 dB, i.e. more errors occur at the relay station 1903 than for the case considered in FIG. 19. It can still, however, be observed that gains in BER can be obtained with increasing signal quality on the link between the relay station 1903 and the destination 1904.

FIG. 21 shows a similar scenario using analog transmission from the relay station 1450 as explained with the assistance of FIG. 16. At the bottom of FIG. 21 the combined LLR $L(u_R)$ is illustrated. It can be seen from the view chart at the bottom of FIG. 21 that the combined LLR is approximately Gaussian distributed. Since analog transmission is used, large transmit powers need to be utilized, in order to transmit the combined LLR reliably, considering that they are superimposed by AWGN as well.

FIG. 22 illustrates an option for at least partly overcoming the problem of having to utilize large transmission powers. At the relay station 1450, the combined LLRs are processed by signal processor 1458, in which the hyperbolic tangent of the combined LLR is determined and used for analog transmission, also referred to as soft bit transmission in the following. A similar option is illustrated in FIG. 23 in which a quantizer 1459 is used for quantizing the LLRs at the relay station 1450, 1903 respectively. FIG. 23 shows at the top on the right-hand side the scenario as it was discussed above, involving the two sources 1901 and 1902, the relay station 1903, and the destination 1904. For the simulation results depicted on the left-hand side of FIG. 23, it was assumed that the SNR, of the links between the sources 1901 and 1902 and the relay station 1903 is 3 dB. At the bottom right-hand side of FIG. 23, the details of the relay station 1450 or 1903 are depicted, in which the quantizer 1459 is shown.

In the view chart on the left-hand side the probability density of the LLR $L_R$ is shown assuming two quantizer regions separated by the dotted line. The two squares represent the quantizer values to be transmitted to the destination 1904. Having only two quantizer regions corresponds to transmitting only one bit per quantized value from the relay station 1903 to the destination 1904. In this scenario it can be observed that almost no degradation due to the quantization occurs with respect to the trans- or mutual information, i.e. almost no information is lost due to quatization.

FIG. 24 shows simulation results on the BER vs. the $SNR_{sd}$ on the link between the sources 1901 or 1902 and the destination 1904. For the simulations, it was assumed that the $SNR_{sr}$ between the sources 1901 and 1902 and the relay station 1903, is 3 dB, for the $SNR_{rd}$ between the relay station 1903 and the destination 1904 0 dB was assumed. The view chart on the left-hand side of FIG. 24 shows BER simulation results for analog transmission indicated by the square markers, soft bit analog transmission indicated by the triangular markers, and quantizer transmission using two quantizer regions, i.e. only one bit per quantizer value by the circular markers. It can be observed that the degradation, when using the quantized values, occurs only for high SNRs between the sources and the destination, whereas for rather low SNRs between the sources and the destination, transmitting the quantized value provides improvements in the BER, which is due to the AWGN taking higher effect on the analog transmission for low SNRs.

FIG. 25 illustrates another simulation scenario, in which five quantizer regions were assumed for a scenario, in which the $SNR_{sr}=0$ dB, i.e. it is lower than in the above discussed scenario. Since five quantizer regions were assumed, an average of 2.3 bits have to be transmitted per quantized value after source coding. The view chart on the left-hand side of FIG. 25 shows the probability density of the LLRs at the input of the quantizer 1459, the quantizer regions are separated by the dotted lines, and the representative values are indicated by square markers.

FIG. 26 shows simulation results on the BER when $SNR_{sr}=3$ dB is assumed for the links between the sources 1901 and 1902, and the relay station 1903, and an SNR of 0.44 dB is assumed for the link between the relay station 1903 and the destination 1904. The view graph on the left-hand side of FIG. 26 shows simulation results for analog transmission indicated by square markers, for soft bit transmission indicated by triangular markers and quantized transmission by circular markers. The simulation results indicate that no degradation at all can be observed when quantization is used.

FIG. 27 illustrates another soft relay and network coding concept wherein quantized transmission from the relay station 1450 to the destination 1470 is used. An equation is illustrated at the top of FIG. 27, which details the combination of the LLRs by the combiner 1457. The output of the combiner 1457 corresponds to the LLR, which can be obtained by an XOR combination of the information words $u_1$ and $u_2$, and which is indicated in the equation at the top of FIG. 27 by an arrow operator pointing to the left. Moreover, FIG. 27 illustrates, within the relay station 1450, the quantizer 1459 for quantizing the combined LLRs to Z, the source coder 1460 for source coding the quantized combined LLRs and an encoder 1461 for channel encoding the source coded combined LLRs before transmission to the destination 1470.

In the example depicted in FIG. 27, it is the task of the quantizer 1459 to compress $L_r$ as much as possible while preserving the relevant information about $u_R=u_1 \oplus u_2$ in the quantized signal Z. This is expressed by the equation at the bottom of FIG. 27 which indicates that the distribution of the quantizer region Z for a given LLR should be chosen, so as to minimize the difference between trans-information $I(L_r,Z)$ between the LLR $L_r$ and the chosen quantizer Z, and the trans-information $I(U_r,Z)$ between the combined information words $U_r$ and the chosen quantizer Z, which is expressed in the equation in terms of a Lagrangian problem based on factor $\beta$.

FIG. 28 illustrates a similar scenario, but shows that if one of the links between the encoders 1410; 1420 and the relay station 1450 degrades, which is exemplified as the link between encoder 1410 and the relay station 1450 in FIG. 28, the combined LLR becomes zero. Therefore, the SNR on the first hop, on the link between the sources and the relay station can be taken into account in the design of the quantizer.

FIG. 29 shows another relay station 1450 in which the LLRs are jointly quantized by quantizer 1459 in order to take the signal quality into account, for which FIG. 30 illustrates the details of the quantizer. On the left-hand side of FIG. 30, a quantizer for symmetric links is shown for which the mutual information after decoding equals 1.98 bits. The relevant mutual information or trans-information after quantization equals 1.93 bits, and since only two quantizer regions are utilized, only 1-bit is required for encoding the source encoded bits on the link between the relay station 1450 and the base station, or destination 1470. The quantizer regions are illustrated in the diagram at the top of FIG. 30 on the left hand side.

On the right-hand of FIG. 30, a quantizer for asymmetric links is shown, for which the mutual information after decoding equals 1.16 bits. The relevant mutual information after quantization equals 1.08 bits, and since five quantizer regions are utilized, an average of 2.1 bits per source coded bit is required.

BRIEF SUMMARY OF THE INVENTION

Summarizing the conventional concepts, relaying is a promising method in order to overcome coverage limitations at reasonable cost. However, straightforward relaying methods lead to a capacity penalty factor of 0.5, since a time slot has to be split into two hops. Another problem is the processing delay in the relay, which may lead to a non-tolerable increase in the round-trip delay, which dues to the decoding at the relay station according to the above described concepts. The alternative of an amplify-and-forward relaying method, which circumvents the decoding delay at the relay station, causes a lower processing delay, however, these schemes suffer from noise amplification in the relay.

Therefore, it is the object of the present invention to provide an improved concept for relaying.

The object is achieved by a relaying station according to claim 1, a method for relaying according to claim 8, a decoder according to claim 9, a method for decoding according to claim 15, and a system according to claim 17.

Embodiments of the present invention are based on the finding that an improved performance in a relaying scenario can be obtained by relaying direct soft information on the received signals at the relay station, including reliability information, instead of completely decoding the received signals. The soft information can then be quantized and forwarded to the destination, where the quantizer can be optimized to the respective channel conditions. Embodiments can therewith overcome the problems of noise amplification, decoding delay, error propagation, and capacity reduction due to multi-hop transmission.

Embodiments may consider one or multiple users transmitting for example to a common sink or destination using a relay station. Optionally, at the relay station signals of multiple users may be jointly quantized and correspondingly at the destination, joint decoding for all users, which have been processed jointly at the relay station, may be performed using for example, iterative algorithms.

Embodiments are based on the finding that if explicitly computed soft information is forwarded by a relay station, rather than an amplified version of a noisy received signal, noise enhancement can be avoided. At the same time, the processing delay can be kept to a minimum. Embodiments of the present invention may yield a higher user satisfaction in terms of a higher throughput and a lower delay at a relatively low infrastructure cost. Embodiments provide the advantage that a low cost relay station may extend coverage of present communication systems. Moreover, improved performance can be obtained when compared, for example, to amplify-and-forward relaying concepts. In addition, low delays or latency times can be achieved, since no decoding has to be performed at the relay station. Low delay and high throughput may be achieved, since the signals of multiple users can be processed, for example, quantized jointly with high efficiency at the relay station.

Embodiments are further based on the finding that information obtained at the relay station can still be helpful for decoding at the destination, even if the source relay links are not sufficiently good enough to support error free recovery of the source messages. Embodiments may provide a practical method of forwarding this information to the destination or decoder, respectively. Embodiments may therewith provide the apparent advantage of the relay station not performing soft decoding of its received packets resulting in a minimal delay at the relay station.

Advantages may be achieved by embodiments by not performing soft decoding at the relay station, but directly processing the received symbols at the relay station. Additional advantages are achieved with respect to pure analog transmission from the relay station by appropriately quantizing the received LLRs at the relay station. By quantizing the received symbols at the relay station, noise amplification, for example caused by amplify-and-forward relaying protocols, can be avoided. Embodiments may further provide the advantage that quantizers can be adapted to the respective channels conditions, between a source and a relay station, as well as between the relay station and a destination.

Embodiments may also consider asymmetric transmission scenarios. In other words, embodiments may consider that source-to-relay station radio channels of different users may have different SNRs and that the reliability of the LLR of a network coded message may undesirably be dominated by the user with the worst source-to-relay station channel. Embodiments may overcome this drawback by using a quantizer design which does not rely on an intermediate step of computing the LLR of the XOR operation between two user symbols, enabling the relay station to sufficiently handle different source to relay station channel qualities. Moreover, embodiments may rely on relay stations having channel state information (CSI=Channel State Information) or signal quality measures about the source-to-relay station links, and the relay to the destination links which, however, do not rely on any channel quality information on the outer source to destination links.

In other words, embodiments may provide the advantage that they do not need information on the source-to-destination links at the relay station, and may, therefore, save transmission capacity and signaling overhead. Embodiments may compress the information at the relay station without having to take any side information into account, which may be available at the destination only.

Embodiments may further allow joint processing of users at the relay station. Embodiments may enable a quantization framework at the relay station preserving relative information on the received signals, without performing the soft decoding of the received packets.

Embodiments of the present invention will be detailed using the accompanying figures, in which:

BRIEF DESCRIPTION OF THE DRAWINGS

FIG. 6*a* provides a pseudo-code according to one embodiment;

FIG. 7*a* provides a pseudo-code of another embodiment;

DETAILED DESCRIPTION OF THE INVENTION

In the following, embodiments of the present invention will be detailed using the accompanying figures, in which similar components or components fulfilling similar tasks will have similar reference signs. In the following, the expressions "relay", "relay station" and "relay apparatus" are used synonymously.

Figure 1A:
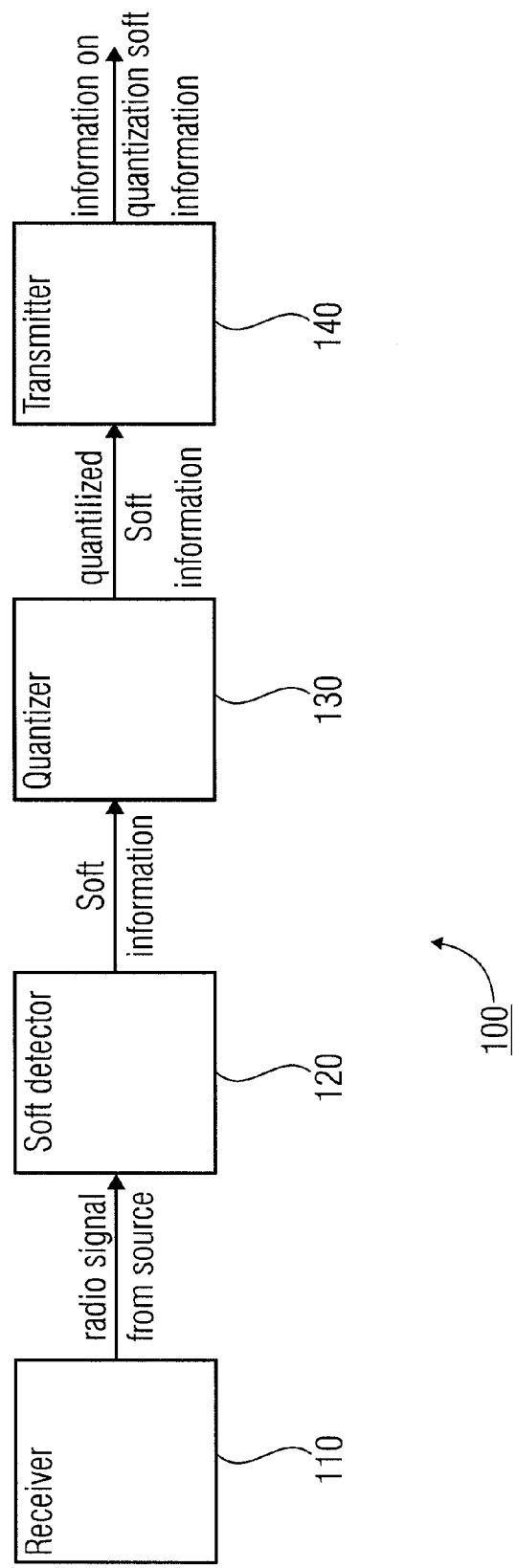
FIG. 1*a* shows an embodiment of a relay station.

FIG. 1a shows a relay station 100 for being operative in a mobile communication system. The relay station 100 comprises a receiver 110 for receiving a radio signal from a source, the radio signal comprising symbols representing an encoded information, the encoded information being based on an encoding rule and comprising payload information and redundancy information. The relay station 100 further comprises a soft detector 120 for detecting a symbol from the radio signal to obtain soft information, the soft information comprising information on the symbol and reliability information on the information on the symbol. The relay station 100 further comprises a quantizer 130 for quantizing the soft information to obtain quantized soft information and a transmitter 140 for transmitting an information on the quantized soft information to a destination.

In embodiments, the receiver 110 can be adapted for receiving another radio signal from another source, the other radio signal comprising other symbols representing another encoded information, the other encoded information being based on the encoding rule, and comprising other payload information and other redundancy information. The soft decoder 120 can be adapted for detecting another symbol from the other radio signal to obtain another soft information, the other soft information comprising an information on the other symbol, and reliability information on the information on the other symbol. The quantizer 130 can be adapted for quantizing a combination of the soft information and the other soft information to obtain the quantized soft information. In other words, the quantizer 130 can be adapted for jointly quantizing the soft information and the other soft information to obtain the quantized soft information.

Figure 1B:
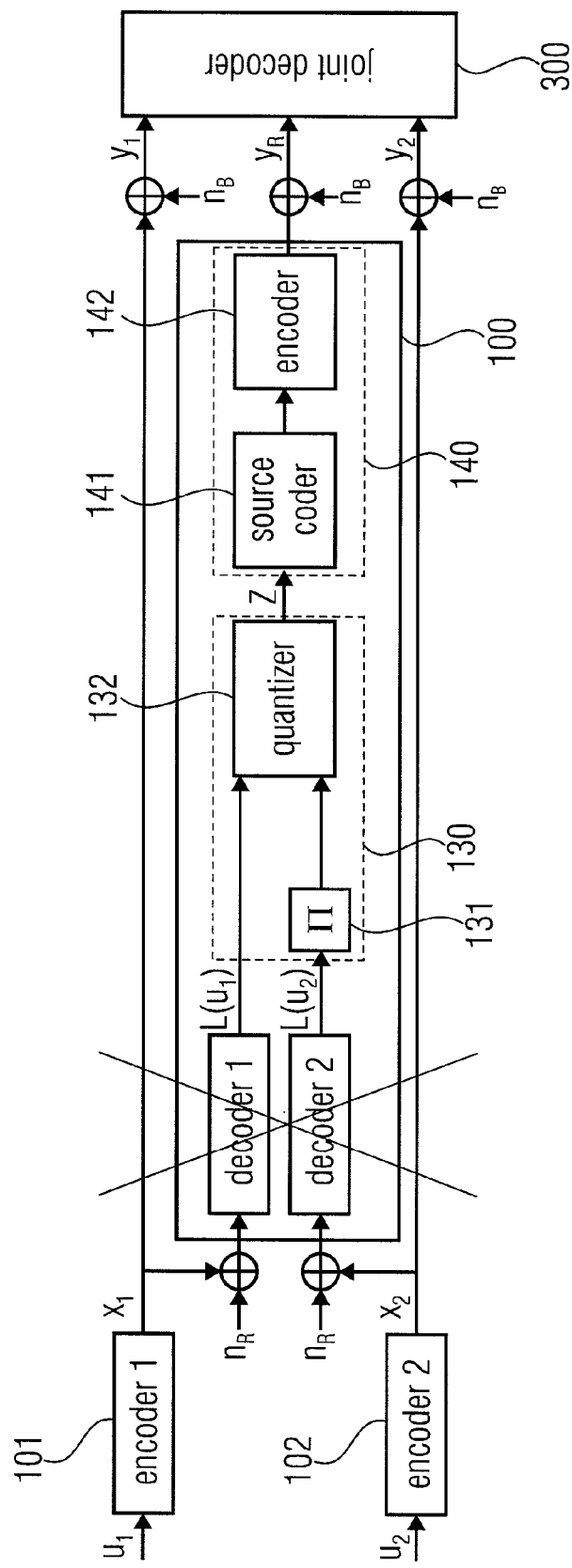
FIG. 1*b* shows a further embodiment of a relay station within a system.
Figure 1C:
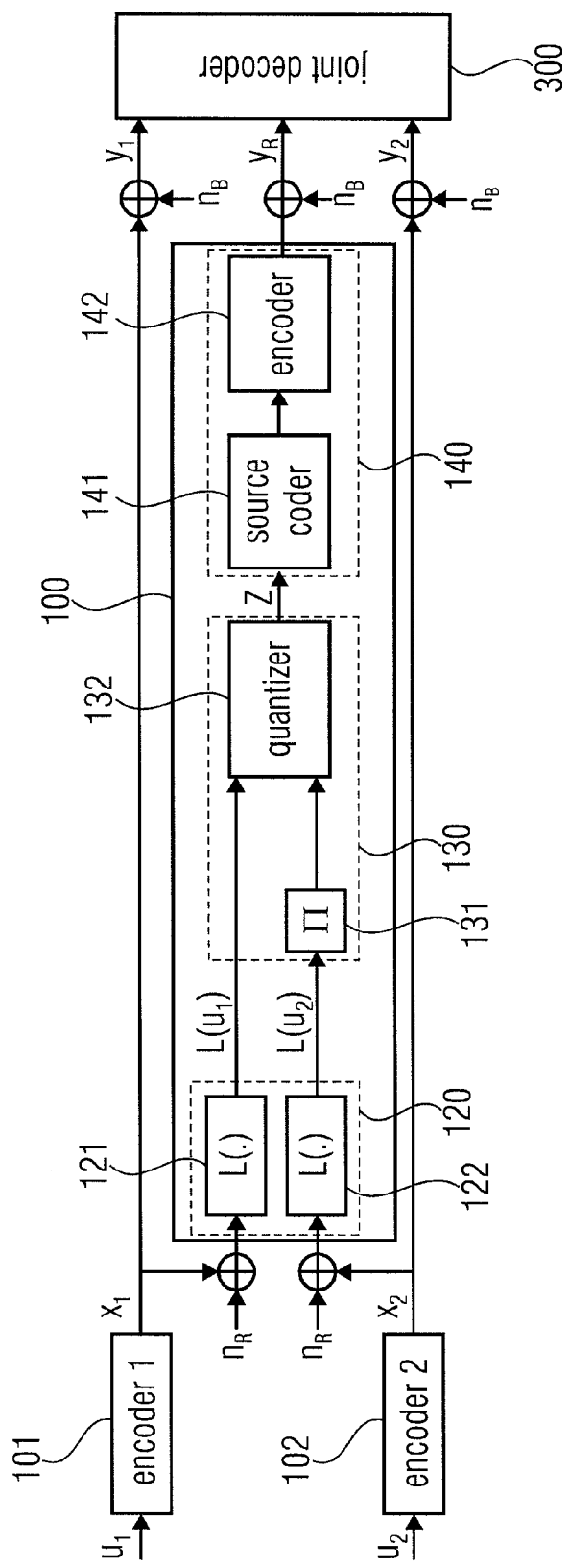
FIG. 1*c* shows another embodiment of a relay station within a system.

FIG. 1b illustrates an embodiment of a relay apparatus 100, showing that in contrast to conventional concepts, full decoding is not carried out by embodiments of the relay station 100. Instead, according to the embodiment illustrated in FIG. 1c, a soft detector 120 is used. In FIGS. 1b and 1c, a first encoder 101 encodes the first information word $u_1$ to a first transmitted symbol or word $x_1$, which is transmitted to the relay station 100 and a joint detector 300. The joint detector 300 may be located at a base-station or NodeB or any destination of the signals. Correspondingly, a second encoder 102 encodes a second information word $u_2$ to a second transmission symbol or word $x_2$, which is transmitted to the relay station 100 and the destination 300.

For simplicity reasons, the receiver 110 is not shown in FIGS. 1b and 1c. The soft detector 120 is shown in FIG. 1c, which is implemented as two single soft detectors 121 and 122 for detecting soft information $L(u_1)$ and $L(u_2)$ for the respective receive signals. FIGS. 1b and 1c show the quantizer 130, which in the embodiment shown in FIGS. 1b and 1b, also comprises an interleaver 131 and a quantizer core 132. In other embodiments the interleaver 131 may not be assigned to the quantizer 130 and may generally be considered as separate entity. The quantizer 130 provides the quantized soft information Z. FIGS. 1b and 1c also show the transmitter 140, which comprises a source coder 141 and an encoder, i.e. channel encoder, 142, for processing the quantized soft information Z before transmitting information on the quantized soft information Z to the destination 300.

In the following, an embodiment for a symmetric case will be considered first, in which the radio channels of the two encoders 101 and 102 are assumed to both experience the same quality.

At each source $s_i$, i=1,2, a block of information bits $u_i \in \{0,1\}^{k_i}$ is encoded to a block of code bits $c_i \in \{0,1\}^{n_i}$ with a channel code of rate $R_i = k_i/n_i$. Throughout, a BPSK modulation at the sources is assumed so that the transmit block at source i is $x_i \in \{+1,-1\}^{n_i}$. For the following, it is generally assumed that $n=n_1=n_2$. Although being suboptimal, for ease of implementation, communication is presumed to take place on channels orthogonalized, in either time, frequency or code. Generally, orthogonality may not be required in embodiments.

Without loss of generality, a time-division network with three phases is considered, where the two sources transmit in time slots 1 and 2, respectively, and the relay transmits its codeword $x_r$ in the third time phase. Then, the received signals at the relay and the destination are given by $$y_{r,i} = x_i + n_{sr,i}$$

$$y_{d,i} = x_i + n_{sd,i}$$

$$y_r = x_r + n_{rd,i},$$

where the zero-mean noise variables follow a circular symmetric complex normal distribution with variances $\sigma_{sr,i}^2$, $\sigma_{sd,i}^2$ and $\sigma_{rd,i}^2$ respectively.

Figure 2:
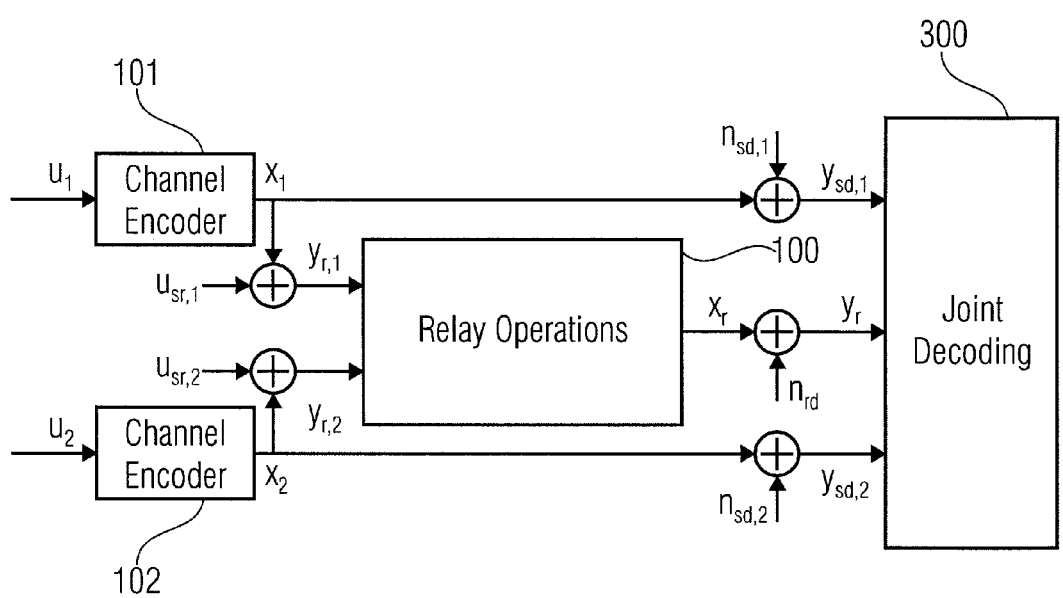
FIG. 2 shows a graphical representation of a system model.
Figure 3A:
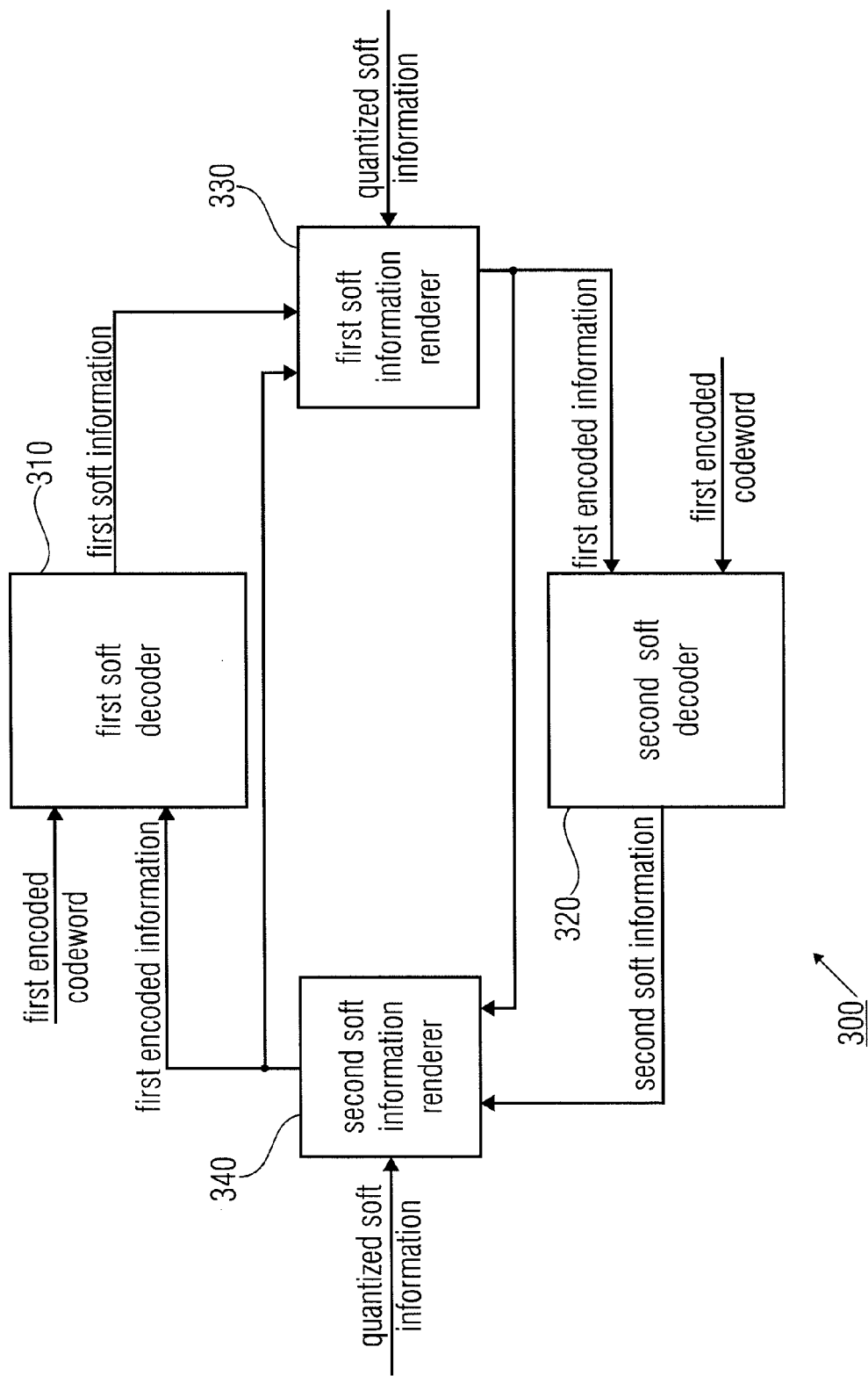
FIG. 3*a* shows an embodiment of a decoder.

FIG. 2 shows graphical representation of a system model. FIG. 2 shows the channel encoders 101 and 102, the relay station 100 and a decoder 300, which is the destination for transmission. FIG. 3a illustrates an embodiment of a decoder 300. FIG. 3 shows a decoder 300 for decoding a first encoded codeword to obtain first soft information on a first codeword and a second encoded codeword to obtain second soft information on a second codeword. The decoder 300 comprises a first soft decoder 310 for determining the first soft information on the first codeword based on the first encoded codeword. The decoder 300 further comprises a second soft decoder 320 for determining the second soft information on the second codeword based on the second encoded codeword and on second a-priori information.

Moreover, the decoder 300 comprises a first soft information renderer 330 for providing the second a-priori information based on the first soft information and quantized soft information, the quantized soft information being based on a combination of the first encoded codeword and the second encoded codeword. The decoder 300 further comprises a second soft information renderer 340 for providing first a-priori information based on the second a-priori information, the quantized soft information and the second soft information. The first soft decoder 310 is further adapted for determining updated first soft information on the first codeword based on the encoded first codeword and the first a-priori information. In other words, in embodiments, an iterative process is carried out which is similar to a turbo-code concept, however, quantized soft information is considered which is based on a combination of the two encoded codewords, and consequently allows to derive information on the respective other encoded codeword. The combination may correspond to a joint quantization of the respective soft information on the codewords at the relay station.

In embodiments, the first soft information renderer 330 can be adapted for providing updated second a-priori information based on the updated first soft information, the first a-priori information and the quantized soft information. In the following, the input a-priori information may also be based on extrinsic information, which is determined by the respective other decoder branch.

In embodiments, the quantized soft information may be provided by a relay apparatus 100, in which, accordingly, the soft detector 120 can be adapted for obtaining the soft information in terms of a LLR. The soft detector 120 can be adapted for obtaining the soft information $L_1$ in terms of an LLR and the other soft information $L_2$ in terms of a LLR and the quantizer 130 may be adapted for determining the combination $L_r$ of of the soft information and the other soft information in terms of an LLR as well.

Figure 3B:
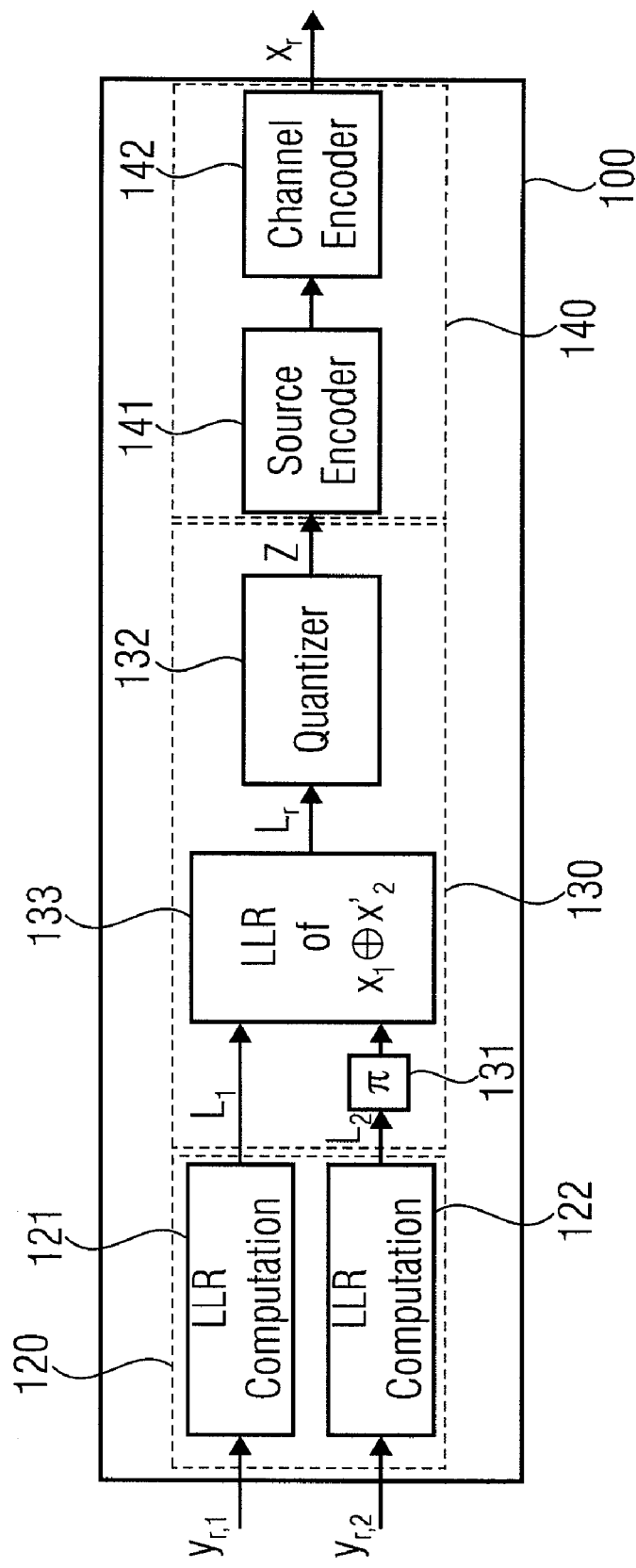
FIG. 3*b* shows another embodiment of a relay station.

FIG. 3b illustrates another embodiment of a relay station 100. FIG. 3b shows similar components as have already been discussed with respect to FIG. 1c, however, the quantizer 130 comprises a combiner 133 for combining the soft information $L_1$ and the other soft information $L_2$, also referred to as the first soft information $L_1$ and a version $L_2'$, which is an interleaved version of $L_2$ available at the output of the interleaver 131.

Upon receiving $y_{r,1}$ and $y_{r,2}$, the relay computes the LLRs $L_1, L_2 \in \square^n$ on the coded bits $x_1$ and $x_2$, cf. FIG. 3b. Note that the relay does not even attempt to perform decoding of its received packets to minimize delay, but directly transmits a compressed version of its estimates $L_1$ and $L_2'$, where $L_2'$ is the interleaved version of $L_2$. The relay then computes the LLRs $L_r \in \square^n$ of the network coded block of code bits $x_1 \oplus x_2'$, whose m-th element is given by $$L_{r,m} = \ln\left(\frac{1 + e^{L_{1,m}+L'_{2,m}}}{e^{L_{1,m}} + e^{L'_{2,m}}}\right)$$

$$= l_{1,m} \boxplus L'_{2,m}$$

$$\approx \text{sign}(L_{1,m})\text{sign}(L'_{2,m})\min\{|L_{1,m}|, |L'_{2,m}|\},$$

taking the "⊞" notation from J. Hagenauer, E. Offer, and L. Papke, "Iterative decoding of binary block and convolutional codes," IEEE Trans. Inf. Theory, vol. 42, no. 2, pp. 429-445, March 1996. Then, the relay forms a quantized version $Z \in \mathcal{F}$ of $L_r$, where $\mathcal{F}$ is the quantizer index set, source encodes, and channel encodes the quantizer output yielding the relay codeword $x_r \in M^n$, with M being the modulation alphabet used at the relay. Note that by restricting the relay to sending n (complex) symbols from M. The quantizer design will be topic of the following subsections.

In embodiments of the decoder 300, the first soft decoder 310 can be adapted for determining the first soft information in terms of a LLR, accordingly the second soft decoder 320 can be adapted for determining the second soft information in terms of a LLR. Correspondingly, the first soft information renderer 330 can be adapted for providing the second a-priori information in terms of the LLR and the second soft information renderer 340 can be adapted for providing the first a-priori information in terms of a LLR.

The first soft information renderer 330 can be adapted for determining the second a-priori information $L_A^{(2)}$ by a de-interleaved version of $$L_A'^{(2)} = L_E^{(1)} \boxplus L_r,$$

wherein $L_E^{(1)}$ is a combination of the first soft information and the first a-priori information, and $L_r$ is quantized soft information, wherein the de-interleaving is based on a de-interleaving rule and the second soft information renderer 340 can be adapted for determining the first a-priori information $L_A^{(1)}$ by $$L_A^{(1)} = L_E'^{(2)} \boxplus L_r,$$

wherein $L_E'^{(2)}$ is an interleaved version of a combination of the second soft information and the second a-priori information, wherein the interleaving is based on an interleaving rule being inverse to the de-interleaving rule.

Figure 4:
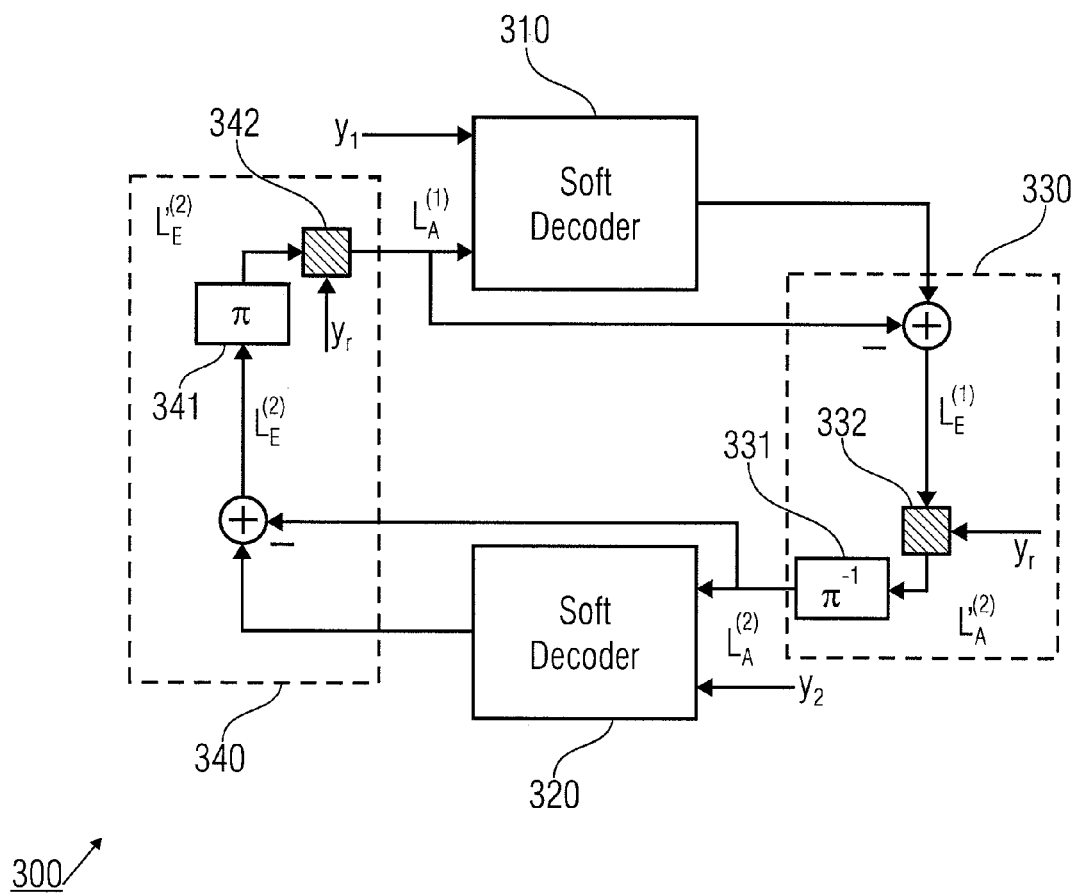
FIG. 4 shows another embodiment of a decoder.

FIG. 4 illustrates another embodiment of a decoder 300 with a first soft decoder 310, a second soft decoder 320, a first soft information renderer 330, and a second soft information renderer 340. FIG. 4 provides more details on the soft information renderers 330 and 340. It can be seen that the soft information renderers 330 and 340 first determine the difference between the soft information output by the respective soft decoders 310 or 320, and their respective a-priori information $L_A^{(1)}, L_A^{(2)}$, respectively. This difference leads to the so-called extrinsic information, and which in FIG. 4 is termed $L_E^{(1)}, L_E^{(2)}$, respectively. Moreover, FIG. 4 shows the first soft information renderer 330 having a de-interleaver 331, the second soft information renderer 340 having the corresponding interleaver 341.

The destination uses the iterative decoder structure 300 shown in FIG. 4, which is strongly reminiscent of a turbo decoder with the two soft decoders acting as component decoders. These component decoders exchange soft information about the coded bits, however, the exchange of information between the decoders is limited by the relay check nodes, which use the received word $y_r$ from the relay to compute the estimate $\hat{L}_r$ of $L_r$ at the destination before calculating the) a priori information $L_{A,m}'^{(2)} = L_{E,m}^{(1)} \boxplus \hat{L}_{r,m}$ and $L_{A,m}^{(1)} = L_{E,m}'^{(2)} \boxplus \hat{L}_{r,m}$ for the component decoders. Now, if the information obtained from the relay about $x_1 \oplus x_2'$ is very reliable, the check nodes barely limit the exchange of extrinsic information, and the overall decoder looks like a turbo decoder, where however, all the code bits are coupled by $x_1 \oplus x_2'$. In contrast, if no information is received from the relay, then the relay check node completely prevents any information exchange between the decoders, resulting in two separate soft decoders 310 and 320.

In the following, an embodiment of a relay station utilizing an iterative optimization algorithm will be explained. The receiver 110 can be adapted for providing a signal quality measure for the radio signal and another signal quality measure for the other radio signal. The signal quality measure or the other signal quality measure may correspond to an SNR, to a signal-to-noise-and-interference ratio (SINR=Signal-to-Noise-and-Interference Ratio), a SIR (SIR=Signal-to-Interference Ratio), a transmission capacity, an outcome of a CRC (CRC=Cyclic Redundancy Check), a bit-error rate (BER=Bit Error Rate), a frame error rate (FER=Frame Error Rate), etc.

In turn, the quantizer 130 can be adapted for quantizing, based on a quantization rule, wherein the quantization rule is based on the signal quality measure and/or the other signal quality measure, and the transmitter 140 can be adapted for transmitting information on the quantization rule to the destination.

In embodiments, the quantization rule can be further based on a transmission capacity between the relay station 100 and the destination, in other embodiments it may be based on a relay to destination signal quality measure, for example, in terms of a SNR, SIR, SINR, etc.

In embodiments, the quantization rule may be such that if the signal quality measure indicates a higher signal quality than the other signal quality measure, the quantized soft information comprises a higher share of the transmission capacity for the soft information than for the other soft information. In other words, if the first encoder 101 has a better channel than the second encoder 102, the relay station, respectively the quantizer 130 within the relay station may assign a higher share of the radio capacity between the relay station 100 and the destination 300 to the quantized soft information of the first encoder.

In embodiments the quantization rule may be based on an information bottleneck algorithm determining a locally optimized quantization based on the signal quality measure, the other signal quality measure, the transmission capacity and the iteration scope, which will be detailed subsequently. The receiver 110 and the transmitter 140 may be adapted for transmitting in a cellular mobile communication system in embodiments. The decoder 300 may further comprise a receiver for receiving encoded quantized soft information and a decoder for decoding the encoded quantized soft information, and a requantizer for providing the quantized soft information based on a quantization rule, and the decoded encoded quantized soft information. The receiver can correspondingly be further adapted for receiving an information on the quantization rule and may be adapted for receiving in a cellular mobile communication system. In other words, the transmission capacity between the relay station 100 and the decoder 300 may correspond to a certain signaling channel with a predetermined transmission rate.

Due to the obvious resemblance of the decoder 300 with a normal turbo decoder, analysis tools like the Extrinsic Information Transfer (EXIT=EXtrinsic Information Transfer) chart as shown by S. ten Brink, "Convergence behavior of iteratively decoded parallel concatenated codes," IEEE Trans. Comm., vol. 49, no. 10, pp. 1727-1737, October 2001, prove to be useful also for this distributed turbo decoder. Although the iterative decoder consists of four components in total, the EXIT curves for the two decoders 310; 320 and the two relay check nodes 332; 342 are the same due to the symmetry in the setup. Therefore, to obtain the EXIT chart for the entire decoder, it suffices to plot two curves only, one for the component decoder 310; 320 and one for the relay check node 332; 342. The EXIT curve of the relay node 332; 342 describes how information at the output of one component decoder acting as input information $I_{in}=I(X_i;L_E^{(i)})$ for the check node is transformed to $I_{out}=I(X_j;L_A^{(j)})$, $i,j \in \{1,2\}, i \neq j$, which is the information at the input to the other component decoder.

Figure 5:
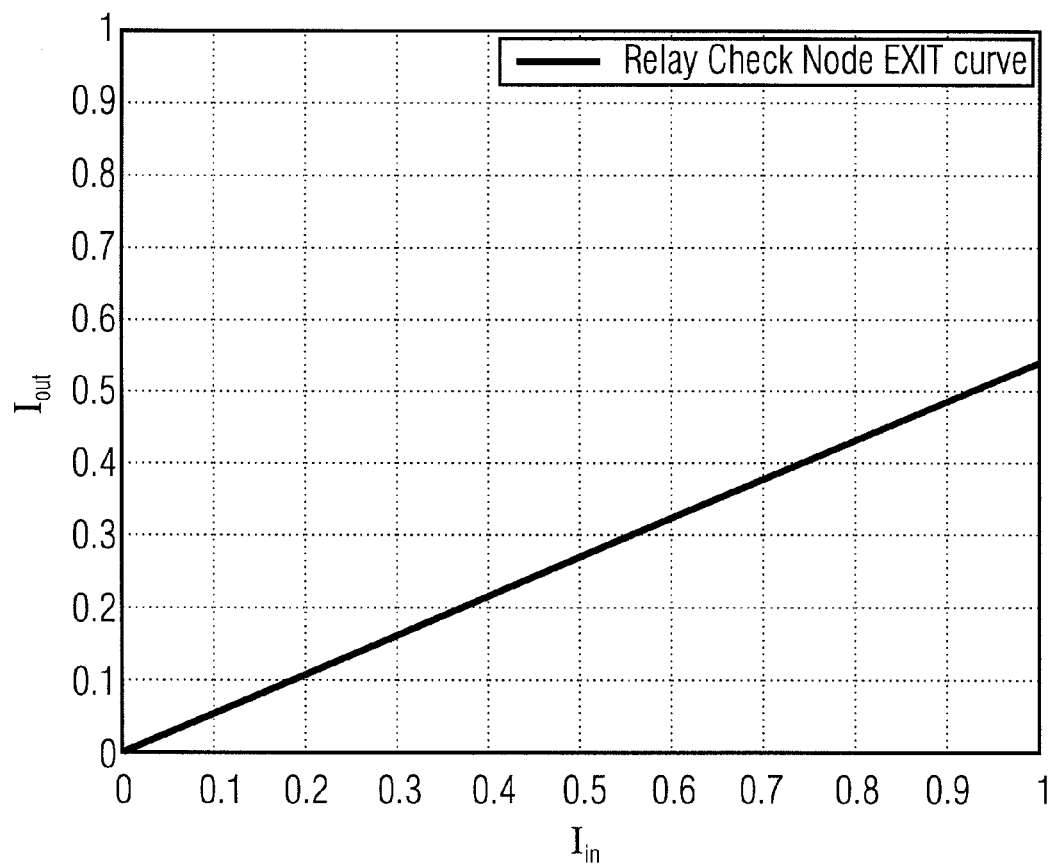
FIG. 5 illustrates an EXIT curve for a relay check node.

FIG. 5 illustrates an EXIT chart of a relay check node, which was determined for $SNR_{sr,1}=SNR_{sr,2}=0.5$ dB, $SNR_{rd}=2.28$ dB, and for three quantization regions. It turns out that the EXIT curve of the relay check node 332; 342 is almost a straight line never exceeding the diagonal of the EXIT chart, see FIG. 5 for an example. The higher the slope of the check node EXIT curve, the better the information from the relay node, with the curve approaching the diagonal for perfect reliability of the messages from the relay. Provided that the channel quality on the channels from the sources to the relay determines the amount of information available at the relay, the goal is then to find a way of forwarding that information to the destination such that the EXIT curve in the decoder has maximal slope, subject to a constraint on the rate on the relay-destination link.

If $L_m \in L$, this is equivalent to seeking a function $f: L \to \mathcal{Z}$ for some finite alphabet $\mathcal{Z}$ that maximizes the amount of information obtainable at the destination about $X_m$, again subject to a rate constraint on the link from the relay to the destination. Direct analog transmission of $L_m$ as in S. Yang and R. Koetter, "Network coding over a noisy relay: a belief propagation approach," in Proc. IEEE Int. Symp., on Information Theory, 2007, would be equivalent to setting $f(L_m)=L_m$, and there are other ways of soft information transmission in embodiments, e.g., transmitting a power-normalized version of $E[X_m|\tilde{Y}_{1,m},\tilde{Y}_{2,m}]$ as a soft bit, as described in Y. Li, B. Vucetic, T. F. Wong, and M. Dohler, "Distributed turbo coding with soft information relaying in multihop relay networks," IEEE Journal on Sel. Areas in Comm., vol. 24, no. 11, pp. 2040-2050, November 2006. For BPSK modulation, $E[X_m|\tilde{Y}_{1,m},\tilde{Y}_{2,m}]=\tan h(L_m/2)$. In the following, a different approach is taken, and set up the problem of finding the optimal function $f(L_m)$ as a rate distortion problem.

In the following, a design of the relay station function of an embodiment will be provided. Rate distortion theory dictates that, given a sequence of i.i.d. random variables $L_1, L_2, \ldots, L_n$ from the source alphabet L distributed according to $p(\ell)$, the minimum rate required to represent the source at distortion D by a random variable Z from the reproduction alphabet $\mathcal{Z}$ is $$R(D) = \min_{p(z|l)} I(L; Z) \text{ s.t. } E[d(z, l)] \leq D$$

where $d: L \times \mathcal{Z} \to \mathbb{R}_0^+$ is the distortion measure. In order to solve a rate distortion problem, the distortion measure has to be chosen and fixed in advance, and finding the right distortion measure for a particular problem is not an easy task in general. Given that fact, it seems to be equally hard to choose a distortion for the problem considered here, namely quantizing the LLRs at the relay node. Therefore, the approach taken by Tishby et al. in N. Tishby, F. C. Pereira, and W. Bialek, "The information bottleneck method," in Proc. 37th Ann. Allerton Conf. on Communications, Control, and Computing, 1999 is followed, where the rate distortion problem is dealt with in a different way using the notion of relevance through another variable.

Instead of putting the constraint on the average distortion for some chosen distortion measure, the constraint is that the reproduction variable Z should contain some minimum level of information about a third variable, the relevant variable, which, in some embodiments, is the random variable $X=X_1 \oplus X_2'$. This is exactly what the function of the relay node should be: given an LLR L, transmit a quantized version Z that contains as much relevant information, which is information about X. That is, instead of forcing, e. g., the squared error between L and Z to be below some threshold, the goal is to preserve as much information as possible in Z about X.

In the following, the information bottleneck method will be explained, which may in embodiments be used in order to determine the quantization rule. In the information bottleneck method, Tishby et al. take the following approach towards quantization of a random variable L. Given the joint distribution $p(x, \ell)$, the goal is to $$\min_{p(z|l)} I(L;Z) \text{ s.t. } I(X;D) \geq \tilde{D}, \qquad (1)$$

where the constraint is now on preserving the relevant information $I(X;Z)$. Since $X \leftrightarrow L \leftrightarrow Z$ form a Markov chain, clearly $I(X;Z) \leq I(X;L)$ due to the data processing inequality. That is, all that one can possibly aim for is preserving all the information available at the relay node about X in the quantizer output Z. Therefore, $\tilde{D}$ has to satisfy $0 \leq \tilde{D} \leq I(X;L)$. Using that $p(x, \ell)$ is fixed and the Markov chain condition $X \leftrightarrow L \leftrightarrow Z$, one obtains that $$\begin{aligned}
I(X;Z) &= I(X;L) + \underbrace{I(X;Z \mid L)}_{=0} - I(X;L \mid Z) \\
&= I(X;L) - \sum_{x,l,z} p(x,l,z) \log\left(\frac{p(x,l \mid z)}{p(x \mid z) p(l \mid z)}\right) \\
&= I(X;L) - \sum_{l,z} p(l,z) \sum_{x} p(x \mid l) \log\left(\frac{p(x \mid l)}{p(x \mid z)}\right) \\
&= I(X;L) - \sum_{l,z} p(l,z) D(p(x \mid l) \| p(x \mid z)) \\
&= I(X;L) - E[D(p(x \mid l) \| p(x \mid z))]
\end{aligned}$$

Since $I(X;L)$ is fixed for a given $p(x, \ell)$, the minimization in (1) is equivalent to the standard rate distortion problem $$\min_{p(z|l)} I(L;Z) \text{ s.t. } E[D(p(x \mid l) \| p(x \mid z))] \leq \hat{D}$$

where now, the right distortion measure $d(\ell, z)$ is the relative entropy between $p(x|\ell)$ and $p(x|z)$, i.e., $$\begin{aligned}
d(l,z) &= D(p(x \mid l) \| p(x \mid z)) \\
&= \sum_x p(x \mid l) \log \frac{p(x \mid l)}{p(x \mid z)},
\end{aligned}$$

and $\hat{D} = I(X;L) - \tilde{D}$. Note that by putting the constraint on $I(X;Z)$ as in (1), one arrives at an equivalent formulation as a rate distortion problem, for which the evidently right distortion measure $d(\ell, z)$ emerged as the relative entropy $D(p(x|\ell) \| p(x|z))$.

Introducing the Lagrangian $M=I(L;Z)-\beta I(X;Z)$ for some $\beta>0$ and evaluating the Karush-Kuhn-Tucker (KKT) conditions, the optimal distribution $p(z|\ell)$ can be given an exact characterizing solution as described in N. Tishby, F. C. Pereira, and W. Bialek, "The information bottleneck method," in Proc. 37th Ann. Allerton Conf. on Communications, Control, and Computing, 1999, and is shown to be $$p(z \mid l) = \frac{p(z)}{N(l,\beta)} \exp(-\beta D(p(x \mid l) \| p(x \mid z))), \qquad (2)$$

where $N(\ell, \beta)$ is a normalizing term ensuring that $p(z|\ell)$ is a probability distribution fulfilling $\Sigma_z p(z|\ell)=1$. However, it is to be noted that the solution specified by (2) is an implicit solution only, since the probability distribution $p(z|\ell)$ is the only free variable, and both $p(z)$ and $p(x|z)$ are fully determined by $p(z|\ell)$.

Although the optimal distribution $p(z|\ell)$ cannot be obtained in closed form, an iterative optimization algorithm used in embodiments can be shown to converge to a local optimum. In essence, this algorithm is very similar to the Blahut-Arimoto algorithm described by R. E. Blahut, "Computation of channel capacity and rate-distortion functions," IEEE Trans. Inf. Theory, vol. IT-18, no. 4, pp. 460-473, July 1972 for computing channel capacities and rate distortion functions, with the main difference that the algorithm for computing the mapping in the information bottleneck setting updates $p(x|z)$ as well. FIG. 6a provides a pseudo code for a respective iterative optimization algorithm.

In the following, the application of the information bottleneck method (IBM=Information Bottleneck Method) to the relay network according to one embodiment will be discussed. The IBM can be used to compute a quantizer or quantization rule which, for a given source-relay SNR, maximizes the relevant information, subject to a constraint on the rate on the relay destination link. To accomplish this, the parameter $\beta$ in the optimization algorithm has to be greatly larger than one to yield a deterministic mapping $p(z|\ell)$, and the distribution $p(x, \ell)$ is obtained for the particular value of $SNR_{sr}$. Summarizing, by designing the quantizer at the relay with the IBM, one can maximize the slope of the EXIT curve of the relay check node, thereby optimizing the convergence properties of the iterative decoder. Throughout, it is assumed that the rate of the quantizer chosen at the relay is such that the quantizer output Z can be communicated reliably to the destination. In the following, the quantizer design on $L_r$ will be referred to as the XOR-solution to the compression problem at the relay.

The above investigations are limited to the case where the source-relay links are symmetric with respect to the SNR. If however, the source-relay links are of different channel quality, then the reliability of $L_r$ about the network coded message will be dominated by the user with the weaker source-relay channel. Therefore, in order for the relay to be able to handle asymmetric source-relay links effectively, the quantizer should be adapted to operate on $L_1$ and $L_2'$ directly, and accordingly, the quantizer design algorithm as well.

In the following, a general embodiment will be considered and the quantizer design in the asymmetric case will be discussed. As in the symmetric case, the framework for the quantizer design will be provided by the IBM, but with a different expression as relevant information, whose choice will be motivated in the following. As mentioned above, the EXIT curve of the relay check node is almost a straight line with $I_{out}=I(X;Z)$ for $I_{in}=1$, and for the symmetric case considered above, the curves are the same for both check nodes in the decoder. In general however, these curves will be different. During the iterative decoding process, the component decoders 310; 320 and soft information renderers 330; 340 produce random variables $L_E^{(1)}$ and $L_E^{(2)}$ with some mutual information $I(X_i;L_E^{(i)})$,i=1,2, which is the input information to the corresponding relay check node. At this point, assuming error-free transmission of the quantizer output Z, it is to be noted that the relay check node in the receiver processes Z and $L_E^{(i)}$ to produce a-priori information for the corresponding component decoder. Therefore, it may be preferred that the quantizer at the relay to be such that $I(X_i;L_E^{(j)})$,i, j∈{1,2}, i≠j, is maximal, both for the information exchange from decoder 1 to decoder 2, and the information exchange from decoder 2 to decoder 1. Since $$I(X_i;Z,L_E^{(j)})=I(X_i;L_E^{(j)})+I(X_i;Z|L_E^{(j)})=I(X_i;Z|L_E^{(j)}),$$

one is left with maximizing $I(X_i;Z|L_E^{(j)})$. Due to the characteristic property of the relay check node of being almost a straight line, the problem simplifies to maximizing the output information for perfect input information $I_{in}=1$.

Now, perfect input information means that $I(X_i;L_E^{(i)})$,i=1, 2, so that $X_i$ is known at the decoder output. Consequently, to allow maximal information transfer from decoder 1 to decoder 2, $I(X_2;Z|X_1)$ should be maximized, and analogously, for decoder 1 to receive maximal information from decoder 2, $I(X_1;Z|X_2)$ should be as large as possible.

Various combinations of these information expressions can be taken to form the relevant information term for the IBM. For example, choosing $I_{rel}=\min\{I(X_1;Z|X_2), I(X_2;Z|X_1)\}$ as the relevant information expression will aim for keeping the turbo loop in the iterative decoder running as long as possible. However, if one user has a very bad source-relay link, that choice of $I_{rel}$ also claims much of the rate of the relay-destination link for communicating very unreliable information about that users data. Therefore, it is proposed in some embodiments to take the average of $I(X_1;Z|X_2)$ and $I(X_2;Z|X_1)$ as the relevant information term, so that the relay can opportunistically allocate more of its rate to the user with the better source-relay channel. In terms of the IBM, to design a quantizer at the relay, one solves $$\min_{p(z|l_1,l_2)} I(L_1;L_2,Z) \text{ s.t. } I(X_1;Z|X_2)+I(X_2;Z|X_1) \geq \tilde{D} \qquad (3)$$

where now, the relevant information is $I_{rel}=I(X_1;Z|X_2)+I(X_2;Z|X_1)$. Rewriting $I_{rel}$ as $$I_{rel}=2I(X_1;X_2;Z)-I(X_1;Z)-I(X_2;Z)$$

allows another interpretation of the relevant information expression: choose the mapping $p(z|\ell_1,\ell_2)$ such that Z contains as much information about the pair $(X_1, X_2)$ while carrying little information about $X_1$ and $X_2$ alone. For some multiplier β>0, the implicit solution to this problem can be shown to be $$p(z|l_1,l_2) = \frac{p(z)}{N(l_1,l_2,\beta)}\exp\{-2\beta D(p(x_1,x_2|l_1,l_2)\|p(x_1,x_2|z)) + \beta D(p(x_1|l_1)\|p(x_1|z))+\beta D(p(x_2|l_2)\|p(x_2|z))\},$$

where D(p∥q) is the relative entropy between p and q, and $N(\ell_1,\ell_2,\beta)$ is a normalizing term ensuring that $p(z|\ell_1,\ell_2)$ is a valid probability distribution. To compute a locally optimal solution to (3), one can use an adapted version of the information bottleneck algorithm, summarized in Algorithm 2 in FIG. 7a, restricting the embodiment to β≫0 to obtain a two-dimensional quantizer using the deterministic mapping $p(z|\ell_1,\ell_2)$. The operations at the relay in the general case are summarized in FIG. 6.

Figure 6B:
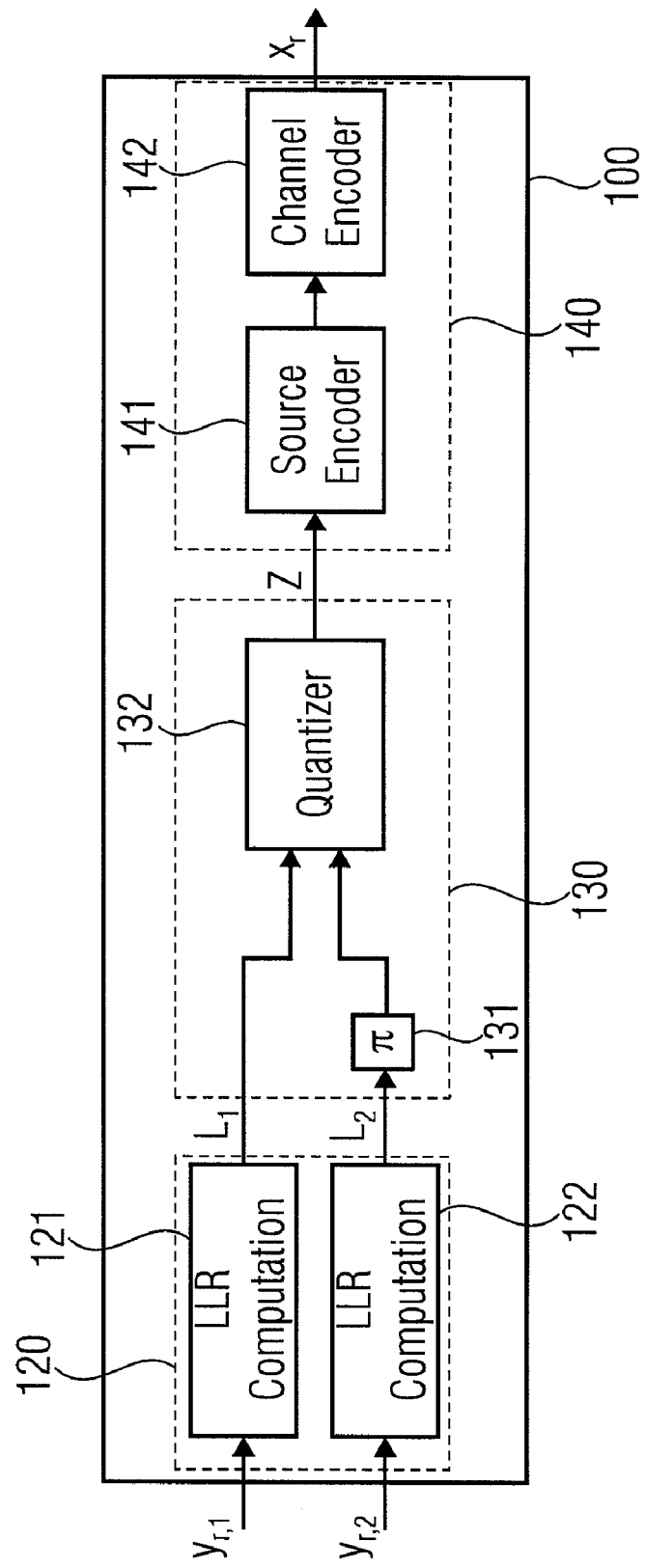
FIG. 6*b* illustrates another embodiment of a relay station.

FIG. 6b illustrates another embodiment of a relay station 100 which comprises similar components as the embodiment described with the assistance of FIG. 3b. However, the combiner is not present as in the embodiment depicted in FIG. 6b, assuming that the quantizer core 132 carries out joint quantization. FIG. 7a provides a pseudo-code of algorithm 2, which may be carried out at the quantizer core 132.

Figure 7B:
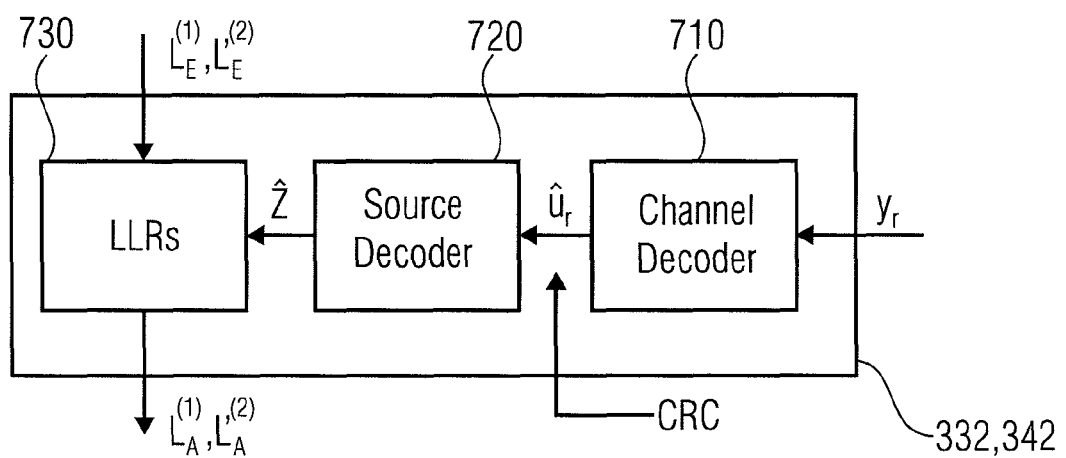
FIG. 7*b* illustrates an embodiment of a decoder.

In the following, a detailed embodiment of the decoder will be explained. FIG. 7b provides details on a relay check node, which corresponds to one of the black squares 332 or 342, depicted within the first and second soft information renders 330 and 340 in FIG. 4. As mentioned above, in embodiments, the decoder 300 may comprise a receiver for receiving a receive signal having information on the quantized soft information. The said received signal is termed $y_r$ in FIG. 7b. A channel decoder 710 may be utilized on the receive signal and a CRC (CRC=Cyclic Redundancy Check) may be performed on the received symbols. A source decoder 720 may then determine $\hat{Z}$ the quantized soft information. In other words, in embodiments the decoder 300 may comprise a channel decoder 710 for channel decoding a receive signal $y_r$, and error detector for detecting errors in the channel decoded signal $\hat{u}_r$, and a source decoder 720 for decoding the quantized soft information $\hat{Z}$ from the channel decoded signal. In embodiments, the decoder may further comprise a LLR determiner 730 for determining a-priori information $L_A^{(1)}$, $L_A'^{(2)}$ based on extrinsic information $L_E^{(1)}$, $L_E'^{(1)}$, and the quantized soft information $\hat{Z}$.

The workings of the relay check node are summarized in FIG. 7b. In case residual errors are detected in $\hat{u}_r$ by, e.g., a cyclic redundancy check (CRC), all the information from the relay is discarded to avoid catastrophic error propagation through the source decoder. The function of the block labeled "LLRs" in FIG. 7b will now be described. To do so, a slightly different view on the decoding algorithm is taken, and the function of that block is derived on the decoding graph, one section of which is shown in FIG. 8.

Figure 8:
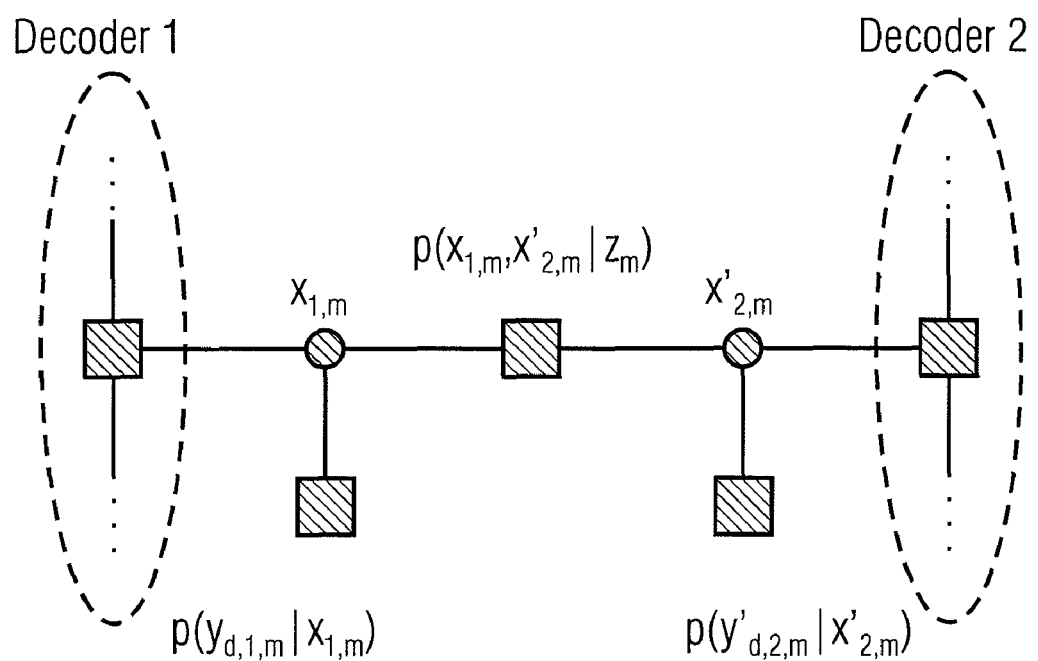
FIG. 8 illustrates one section of a decoding graph of an embodiment.

FIG. 8 illustrates one section of the decoding graph, wherein on the left-hand side decoder 1 refers to the first soft decoder 310, and the decoder 2 on the right-hand side refers to the second soft decoder 320.

The nodes labeled $x_{1,m}$ and $x_{2,m}$ are two variable nodes of the two different component channel codes coupled by the quantization at the relay. The direct observations from the two sources are the function nodes $p(y_{d,1,m}|x_{1,m})$ and $p(y'_{d,2,m}|x'_{2,m})$, whereas the coupling through the quantization at the relay is expressed in the function node $p(x_{1,m},x'_{2,m}|z_m)$.

Since Z is assumed to be available perfectly at the receiver, the destination exploits its knowledge of the quantizer chosen by the relay to obtain $p(x_1,x_2|z)$, which is among the output of the iterative optimization algorithm. Note that the function node $p(x_1,x_2|z)$ is the message passing equivalent of the LLR block in FIG. 7b. To find processing rules for the LLRs $L_E^{(1)}$ and $L_E'^{(2)}$, the message passing rules are applied for function nodes to $p(x_1,x_2|z)$. Using the definitions $$L(x_{1,m},x'_{2,m}=1|z_m)=\ln\left(\frac{p(x_{1,m}=1,x'_{2,m}=1|z_m)}{p(x_{1,m}=-1,x'_{2,m}=1|z_m)}\right) \qquad (4a)$$

$$L(x_{1,m}=1,x'_{2,m}|z_m)=\ln\left(\frac{p(x_{1,m}=1,x'_{2,m}=1|z_m)}{p(x_{1,m}=1,x'_{2,m}=-1|z_m)}\right) \qquad (4b)$$

-continued $$L(x_{1,m}, x'_{2,m} = -1 \mid z_m) = \ln\left(\frac{p(x_{1,m} = 1, x'_{2,m} = -1 \mid z_m)}{p(x_{1,m} = -1, x'_{2,m} = -1 \mid z_m)}\right) \quad (4c)$$

$$L(x_{1,m} = -1, x'_{2,m} \mid z_m) = \ln\left(\frac{p(x_{1,m} = -1, x'_{2,m} = 1 \mid z_m)}{p(x_{1,m} = -1, x'_{2,m} = -1 \mid z_m)}\right) \quad (4d)$$

$$L(x_{1,m}, x'_{2,m} \mid z_m) = \ln\left(\frac{p(x_{1,m} = 1, x'_{2,m} = -1 \mid z_m)}{p(x_{1,m} = -1, x'_{2,m} = 1 \mid z_m)}\right), \quad (4e)$$

one obtains that $$L'^{(2)}_{A,m} = \ln\left(\frac{1 + e^{L^{(1)}_{E,m}} e^{L(x_{1,m}, x'_{2,m} = 1 \mid z_m)}}{e^{L^{(1)}_{E,m}} e^{L(x_{1,m}, x'_{2,m} \mid z_m)} + e^{-L(x_{1,m} = -1, x'_{2,m} \mid z_m)}}\right) \quad (5a)$$

$$L^{(1)}_{A,m} = \ln\left(\frac{1 + e^{L'^{(2)}_{E,m}} e^{L_m(x_{1,m} = 1, x'_{2,m} \mid z_m)}}{e^{L'^{(2)}_{E,m}} e^{-L(x_{1,m}, x'_{2,m} \mid z_m)} + e^{-L(x_{1,m}, x'_{2,m} = -1 \mid z_m)}}\right) \quad (5b)$$

A detailed derivation of the above expressions will be provided at the end of the description.

Equation (5) is closely related to the boxplus computation in the symmetric case. Note that if $$L(x_{1,m}, x'_{2,m} \mid z_m) = 0, -L(x_{1,m} = -1, x'_{2,m} \mid z_m) = L(x_{1,m}, x'_{2,m} = 1 \mid z_m)$$

and $$-L(x_{1,m}, x'_{2,m} = -1 \mid z_m) = L(x_{1,m} = 1, x'_{2,m} \mid z_m),$$

they simplify to $$L_{A,m}^{\prime(2)} = L_{E,m}^{(1)} \boxplus L(x_{1,m}, x'_{2,m} = 1 \mid z_m)$$

$$L_{A,m}^{(1)} = L_{E,m}^{\prime(2)} \boxplus L_m(x_{1,m} = 1, x'_{2,m} \mid z_m).$$

It turns out that application of the general quantizer design algorithm to symmetric SR channels can result in a distribution $p(x_1, x_2 \mid z)$ such that $$L(x_{1,m}, x'_{2,m} \mid z_m) = 0, -L(x_{1,m} = -1, x'_{2,m} \mid z_m) = L(x_{1,m}, x'_{2,m} = 1 \mid z_m), \text{ and}$$

$$-L(x_{1,m}, x'_{2,m} = -1 \mid z_m) = L(x_{1,m} = 1, x'_{2,m} \mid z_m),$$

so that the XOR-solution is recovered in those situations without computing $L_r$ first.

In this section, some simulation results on the quantizer design are provided. Throughout, the underlying channel codes used at the sources are rate ½ recursive convolutional codes with generator $$G(D) = \left(1, \frac{1 + D^4}{1 + D + D^2 + D^3 + D^4}\right).$$

Source coding at the relay is performed using an arithmetic code described in T. Cover and J. Thomas, Elements of Information Theory, John Wiley and Sons, Inc., 2006 (in Chapter 5), and the channel code on the relay-destination link is the turbo code specified in the UMTS standard as described in European Telecommunications Standards Institute, "Universal mobile telecommunications system (UMTS): Multiplexing and channel coding (FDD)," 3GPP TS 125.212 version 3.4.0, Tech. Rep., 2000.

Figure 9:
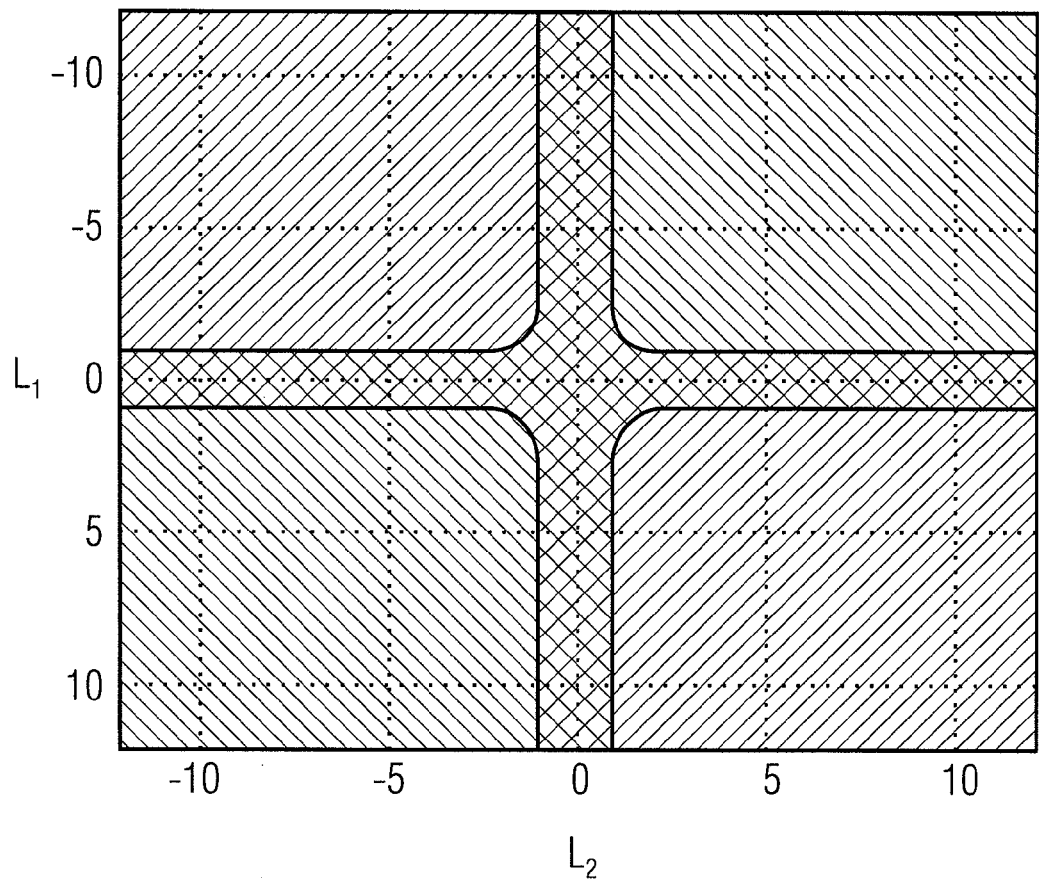
FIG. 9 illustrates quantizer regions obtained for a transmission scenario.

FIG. 9 illustrates a view chart depicting LLR $L_1$ vs. LLR $L_2$, in which three different quantization regions are indicated by different grey scales. The quantizer depicted in FIG. 9 is obtained for $SNR_{sr,1} = SNR_{sr,2} = -2$ dB and three quantization regions.

Figure 10:
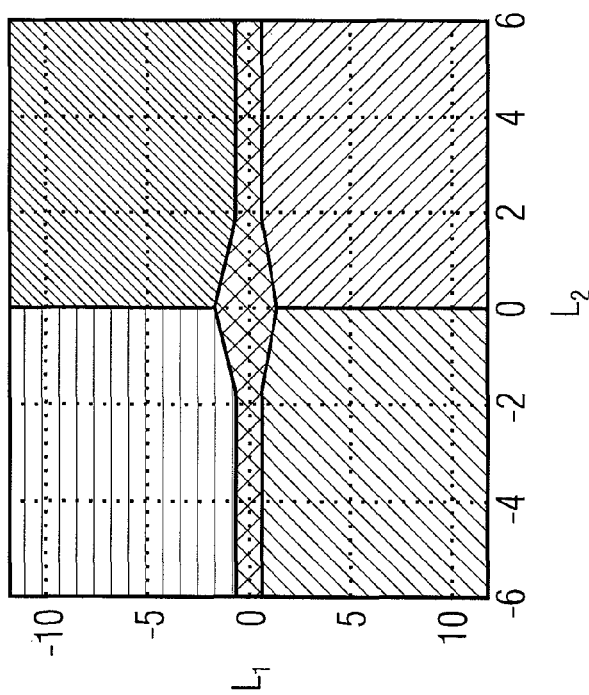
FIG. 10 illustrates quantizer regions and simulation results for an embodiment.
Figure 10:
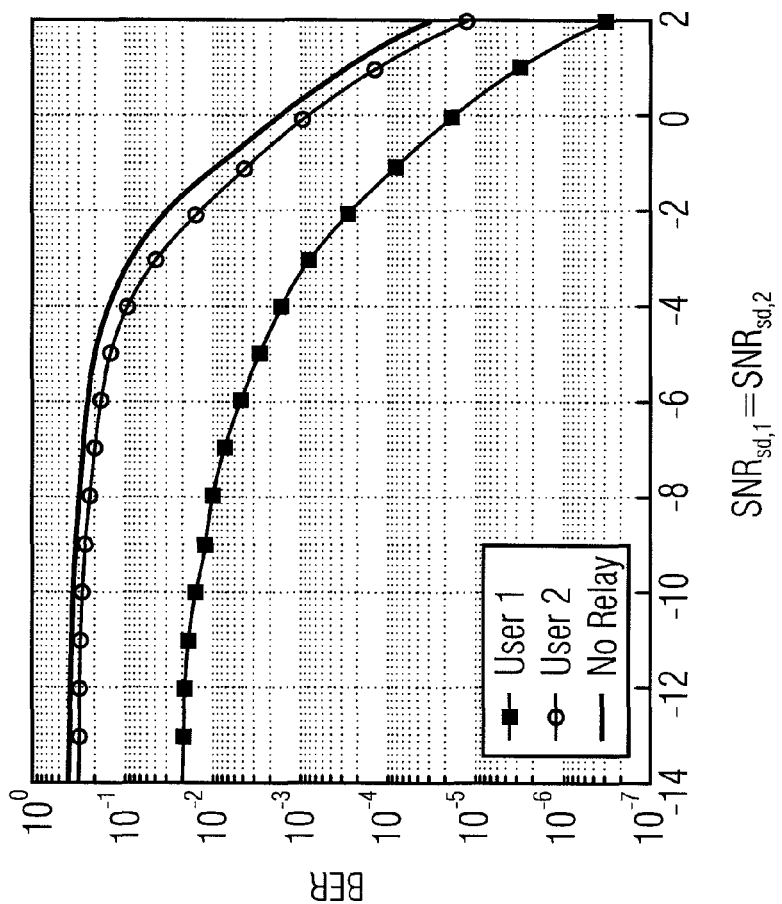

FIG. 10 depicts a quantizer on the left-hand side, obtained for 5 quantization regions for $SNR_{sr,1} = -1$ dB and $SNR_{sr,2} = -8$ dB. FIG. 10 depicts on the right-hand side BER results vs. $SNR_{sd,1} = SNR_{sd,2}$. The simulation results depicted on the right-hand side of FIG. 10 are obtained for the quantizer depicted on the left-hand side of FIG. 10.

The first two examples, shown in FIGS. 9 and 10, depict the partitioning of the ($L_1$, $L_2$)-plane into quantization regions as obtained by Algorithm 2, cf. FIG. 7a. Each of the resulting regions is color coded, with each color or grey scale corresponding to one symbol of the quantizer alphabet $\mathcal{Z}$. Using N=3 regions, the quantizer is shown in FIG. 9 for symmetric source-relay links at $SNR_{sr,1} = SNR_{sr,2} = -2$ dB. Note that this partition effectively mimics the XOR operation at the relay, and since H(Z)=1.44, a minimum SNR on the relay destination link of 2.33 dB is required for error-free transmission. To achieve a word error probability of about $10^{-4}$ with the UMTS turbo code, simulations suggest that 1.5 dB have to be added to the Shannon limit SNR, so that $SNR_{rd} = 3.83$ dB is required.

In contrast, if channel conditions on the source-relay links are profoundly different, then the relay should preferably allocate more of the rate available on the relay-destination channel to the stronger user, and this is exactly achieved with the general formulation of the quantization problem at the relay, as shown in FIG. 10 for N=5 regions, where $SNR_{sr,1} = -1$ dB and $SNR_{sr,2} = -8$ dB. Since H(Z)=2.30, the relay-destination link SNR has to be about 7.45 dB for reliable transmission using the UMTS turbo code as channel code.

Figure 11:
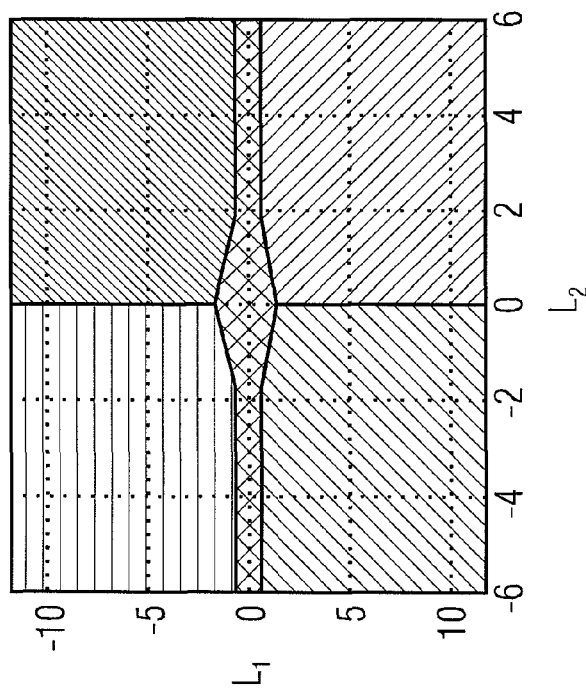
FIG. 11 illustrates quantizer regions and simulation results for an embodiment.
Figure 11:
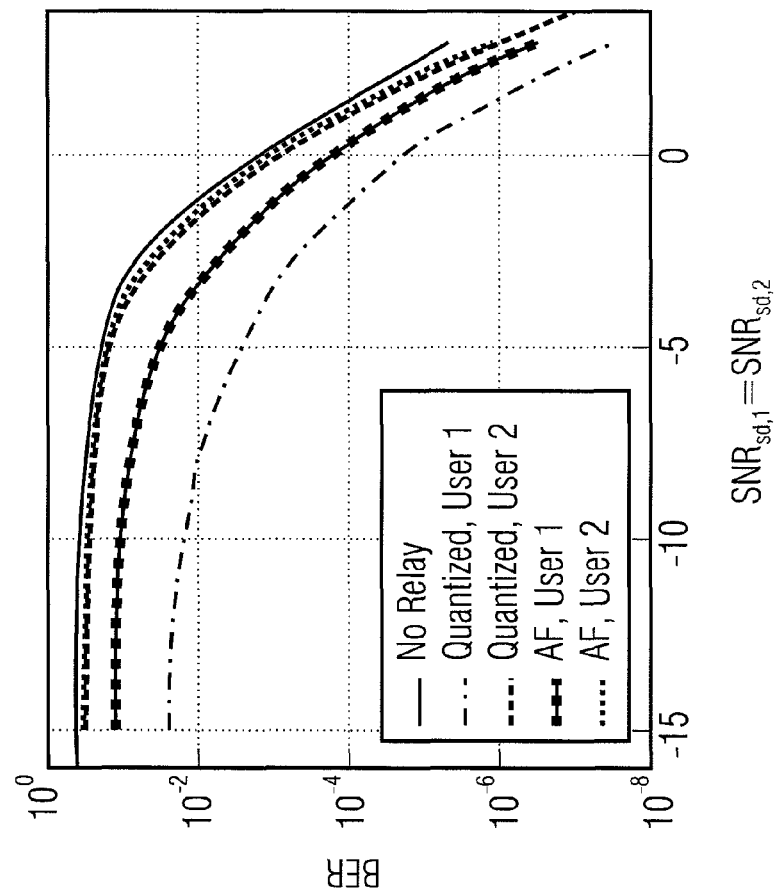

Finally, the bit-error-rate (BER) is plotted in FIG. 11, when the quantizer described above for $SNR_{sr,1} = -1$ dB and $SNR_{sr,2} = -8$ dB, and N=5, is used at the relay. The modulation scheme at the relay is 16-QAM, and $SNR_{rd} = 7.45$ dB. As expected, user 1 with the stronger relay channel shows a superior BER performance than user 2, which is performing slightly better than a user that could not exploit the relay at all.

FIG. 11 shows further simulation results, where the according quantizer is depicted on the left-hand side having 5 quantization regions and the according BER simulation results are depicted on the right-hand side. In FIG. 11 on the right-hand side simulation results are also depicted for the amplify-and-forward concept for user 1 and user 2, which is labeled AF. It can be seen that the embodiment achieves gains in the BER performance.

Figure 12:
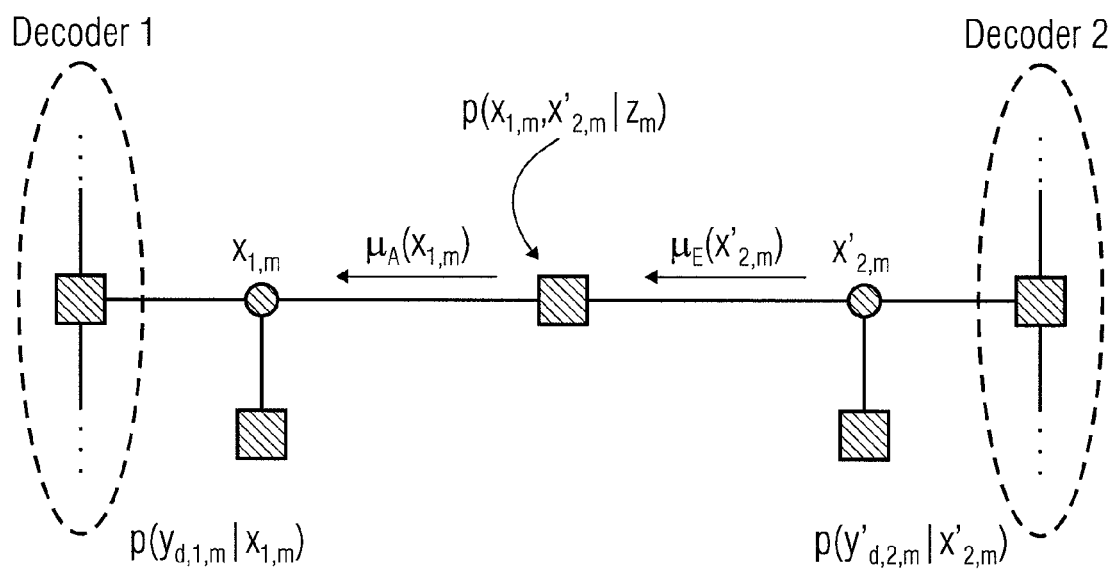
FIG. 12 illustrates one section of a decoding graph of an embodiment.
Figure 13:
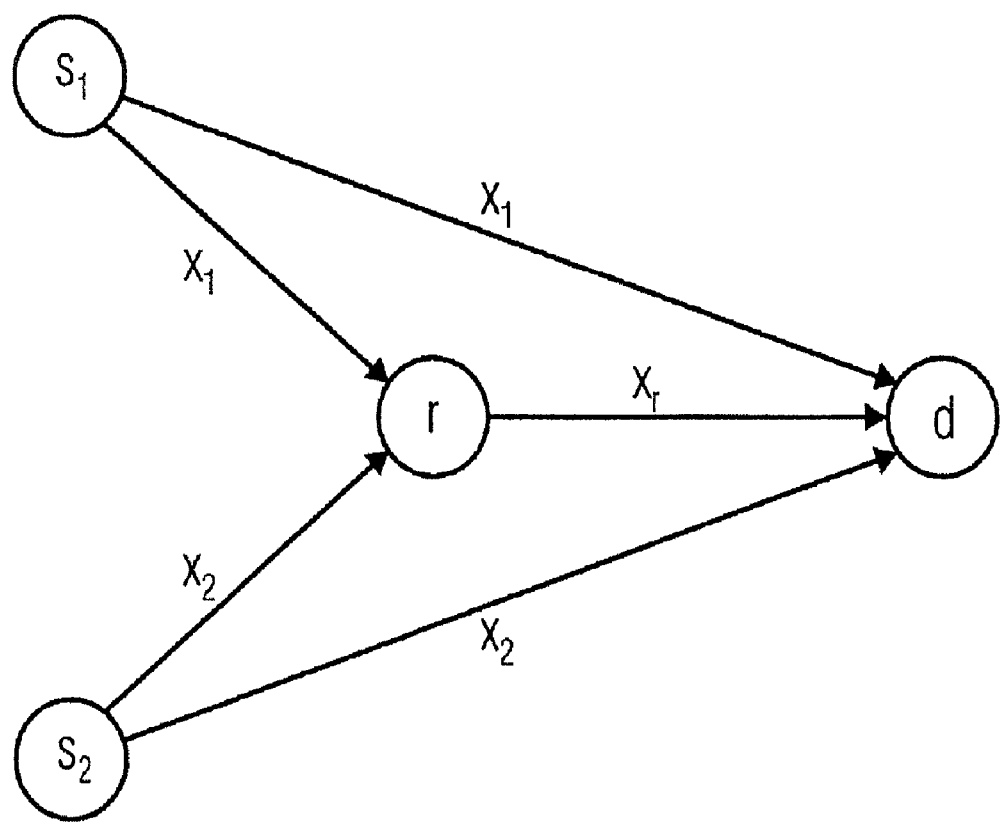
FIG. 13 illustrates a general transmission scenario.
Figure 14:
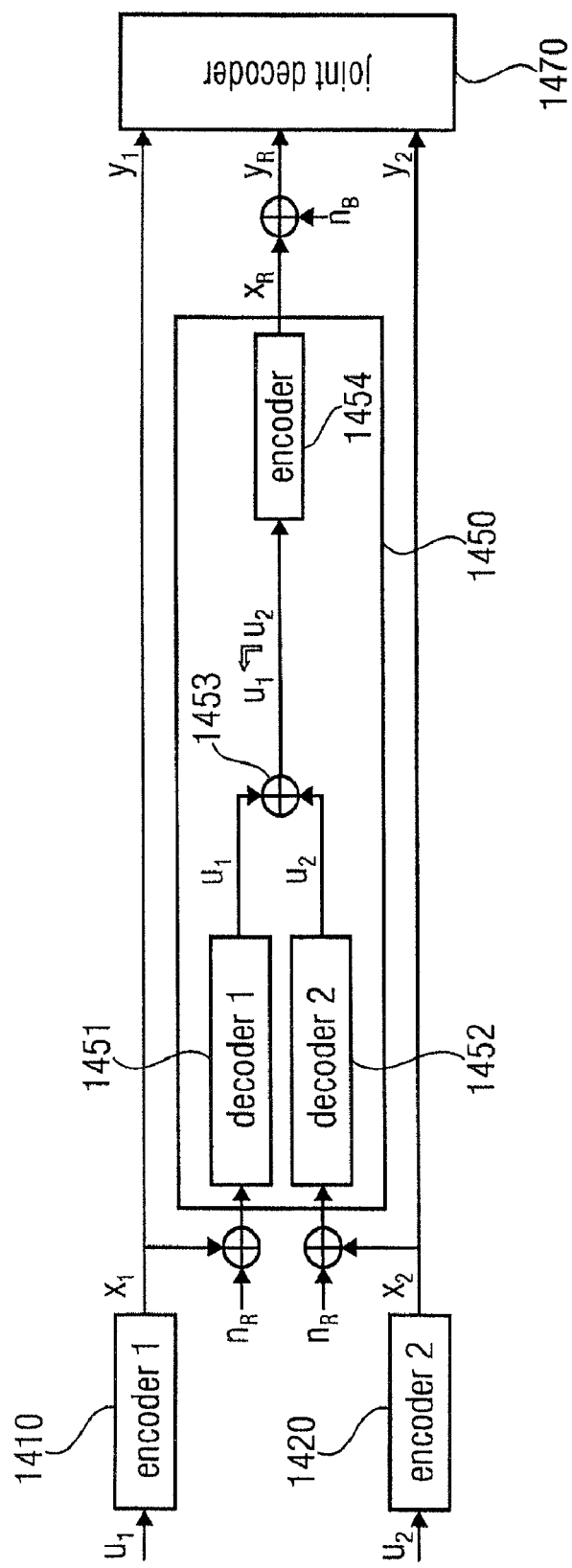
FIG. 14 illustrates a state of the art relaying concept.
Figure 15:
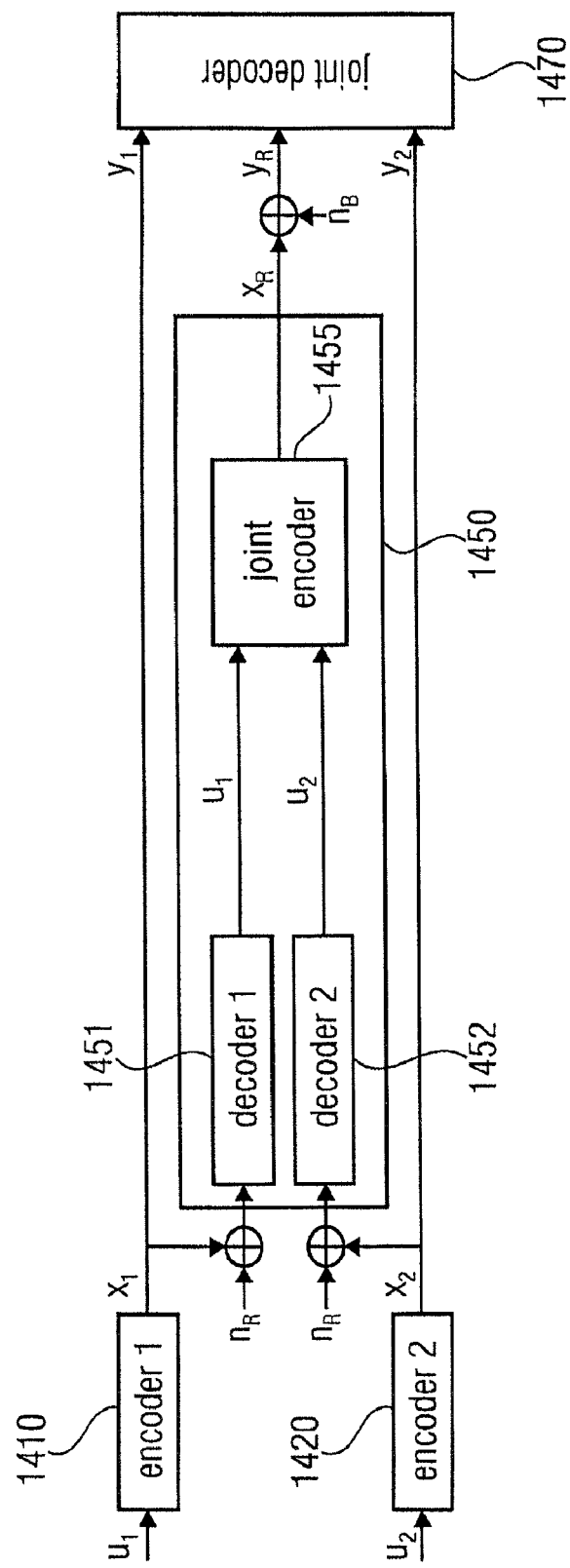
FIG. 15 illustrates another state of the art relaying concept.
Figure 16:
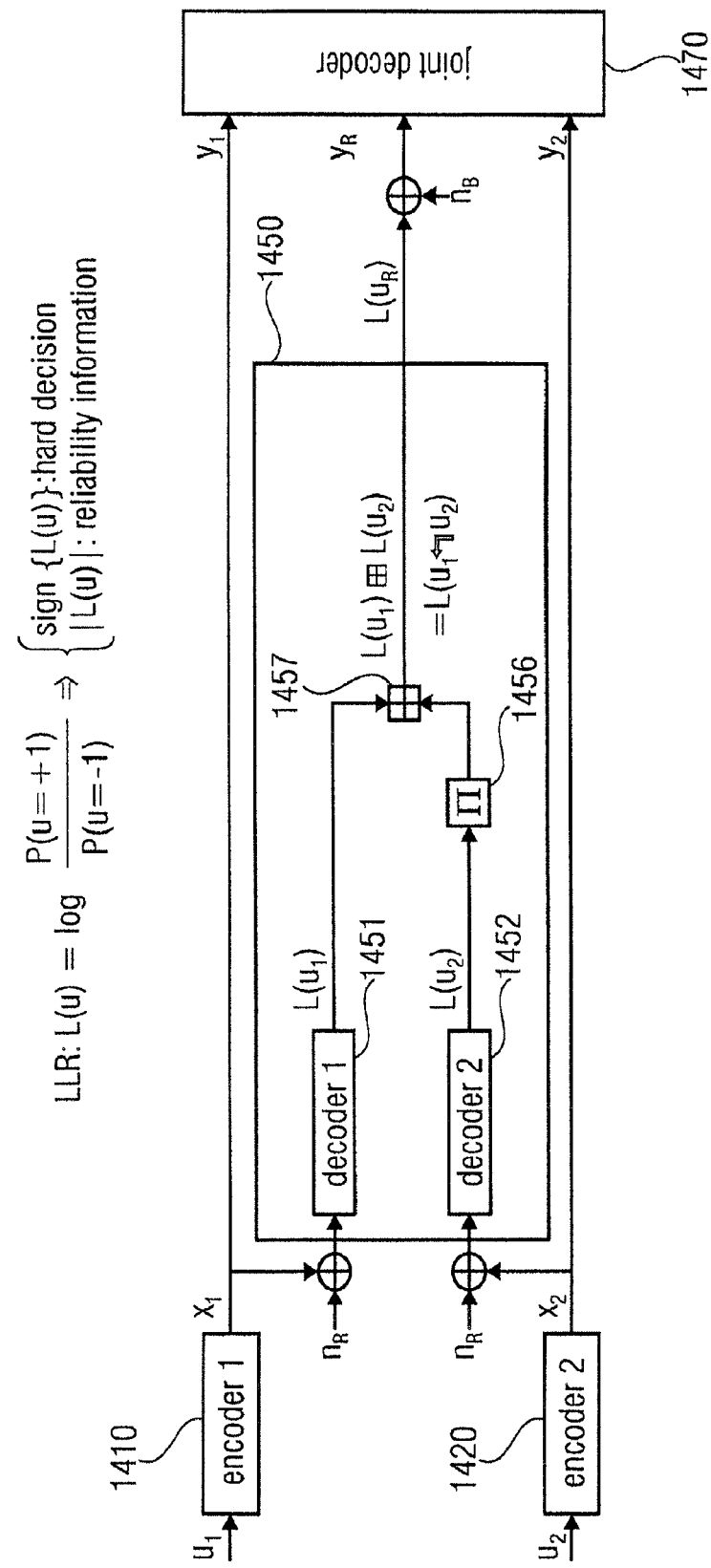
FIG. 16 illustrates another state of the art relaying concept.
Figure 17:
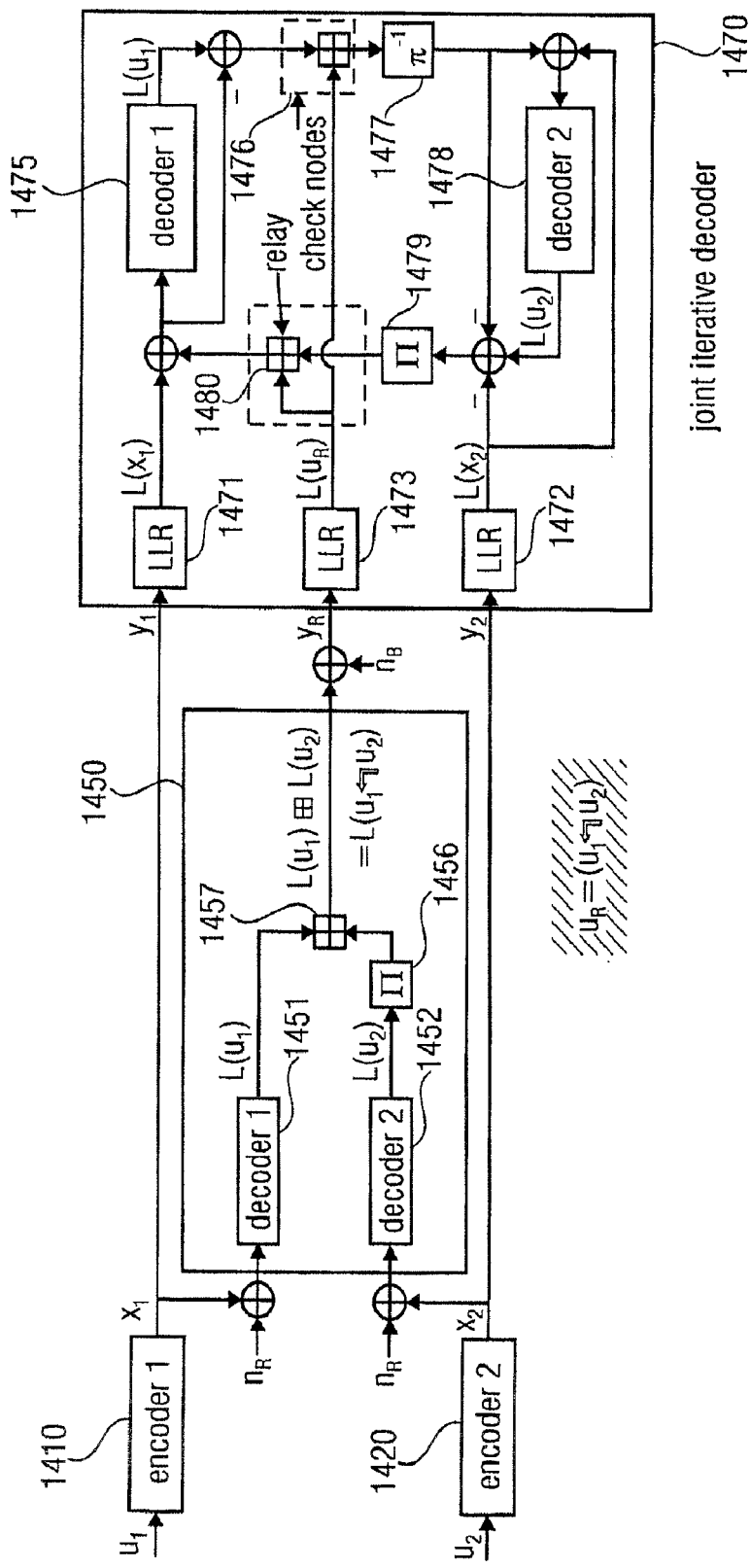
FIG. 17 illustrates a state of the art joint iterative decoder.
Figure 18:
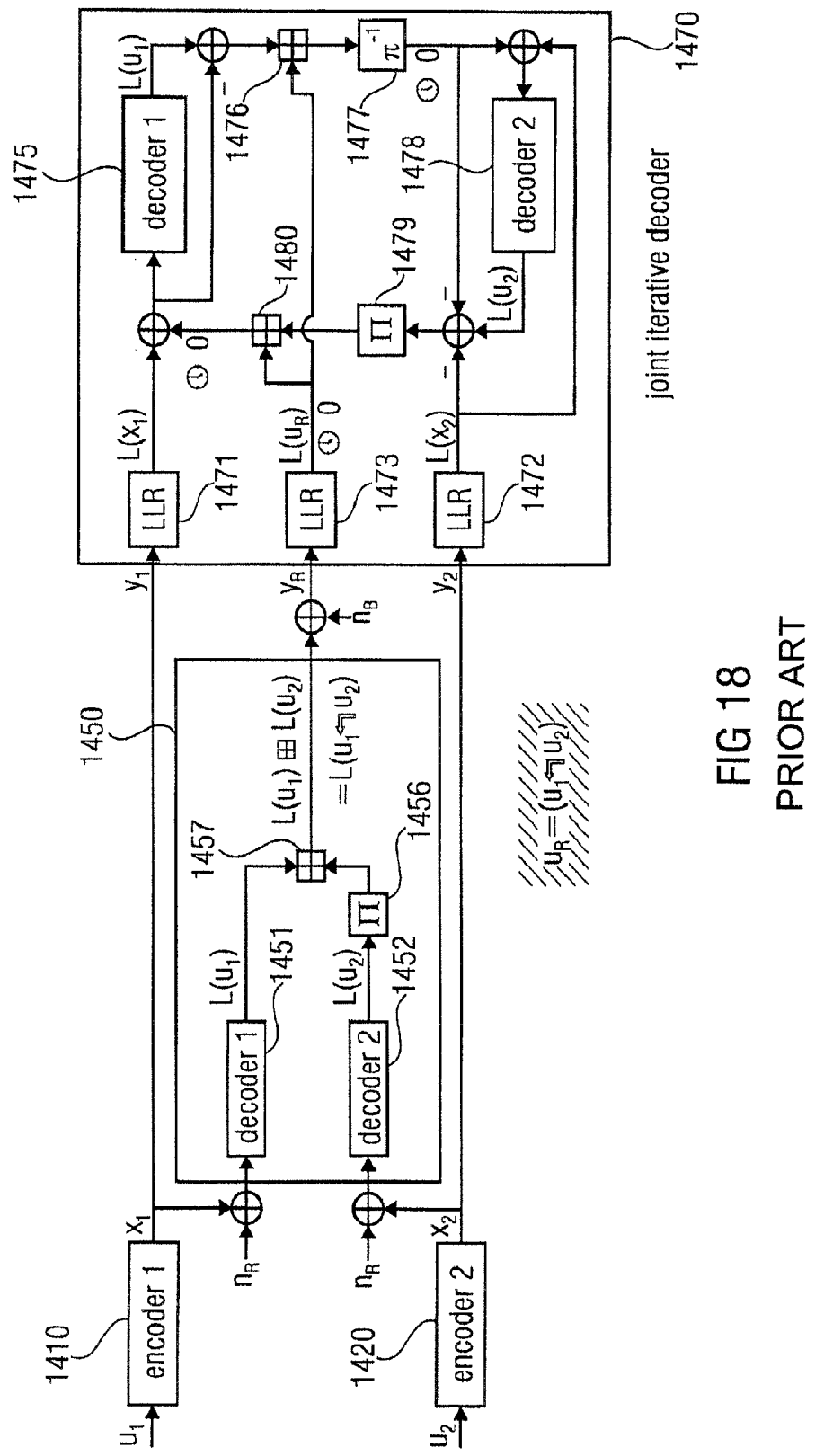
FIG. 18 illustrates a joint iterative decoder in a scenario in which the source to relay channel is weak.
Figure 19:
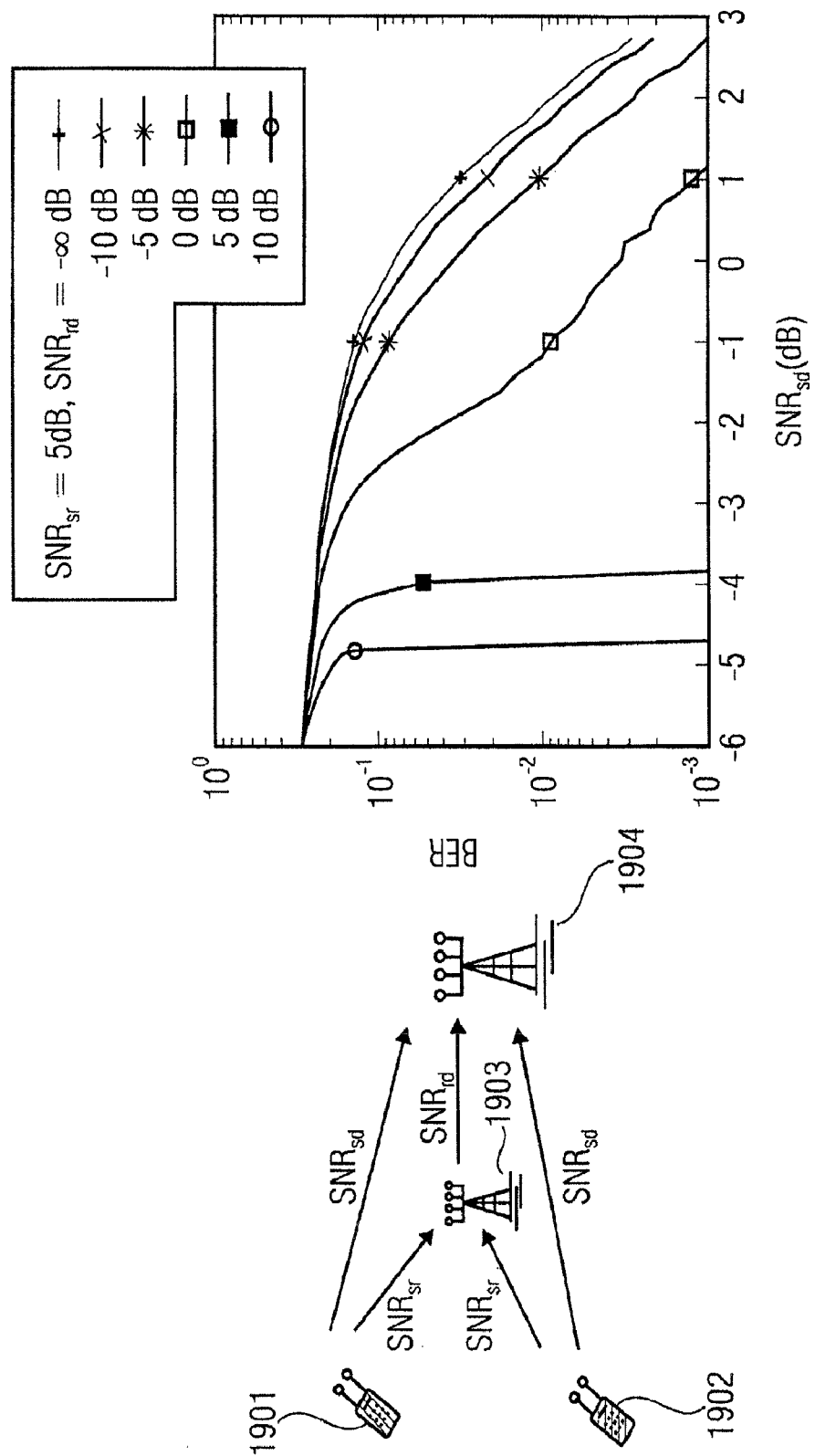
FIG. 19 illustrates simulation results of state of the art concepts.
Figure 20:
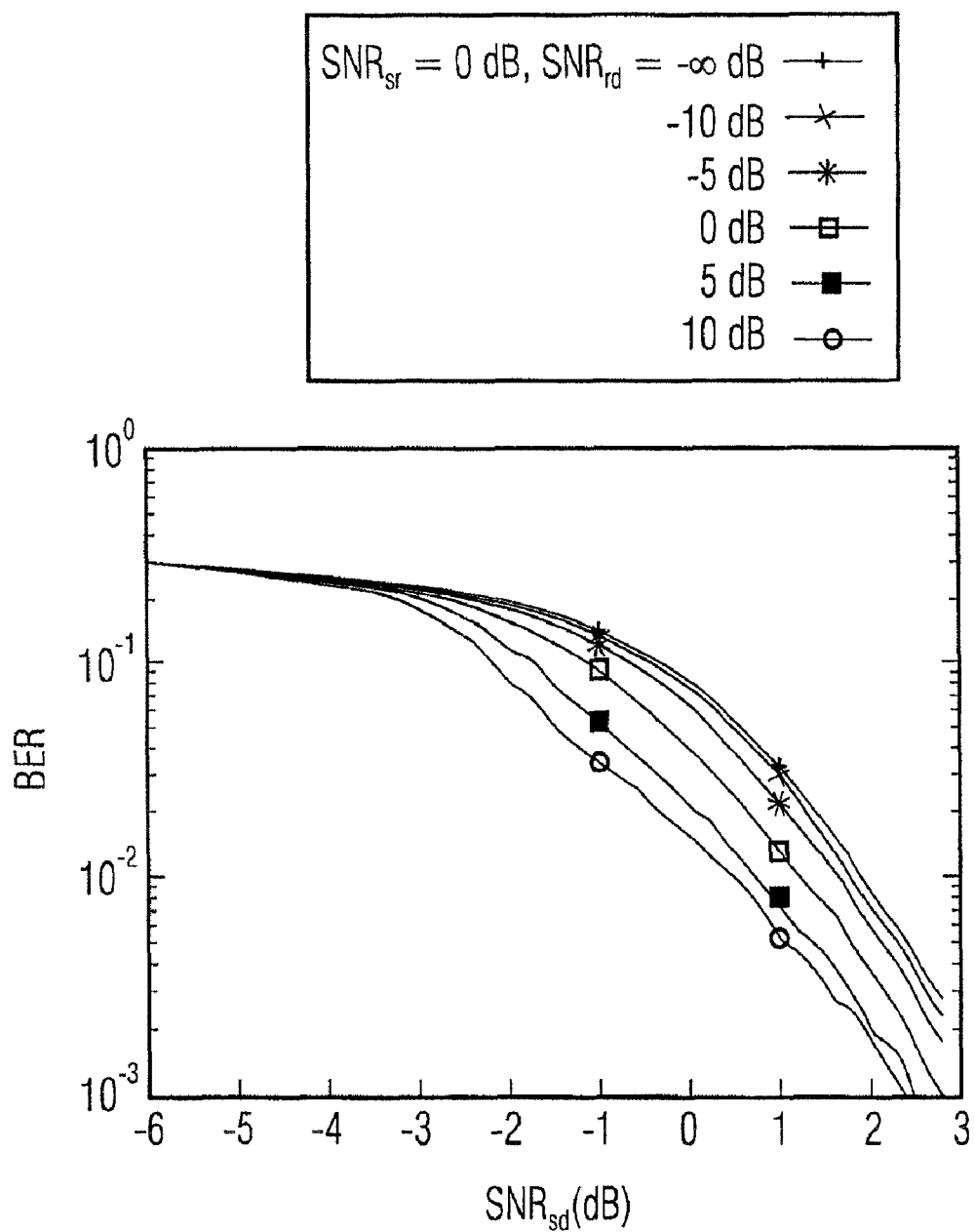
FIG. 20 illustrates simulation results of state of the art concepts.
Figure 21:
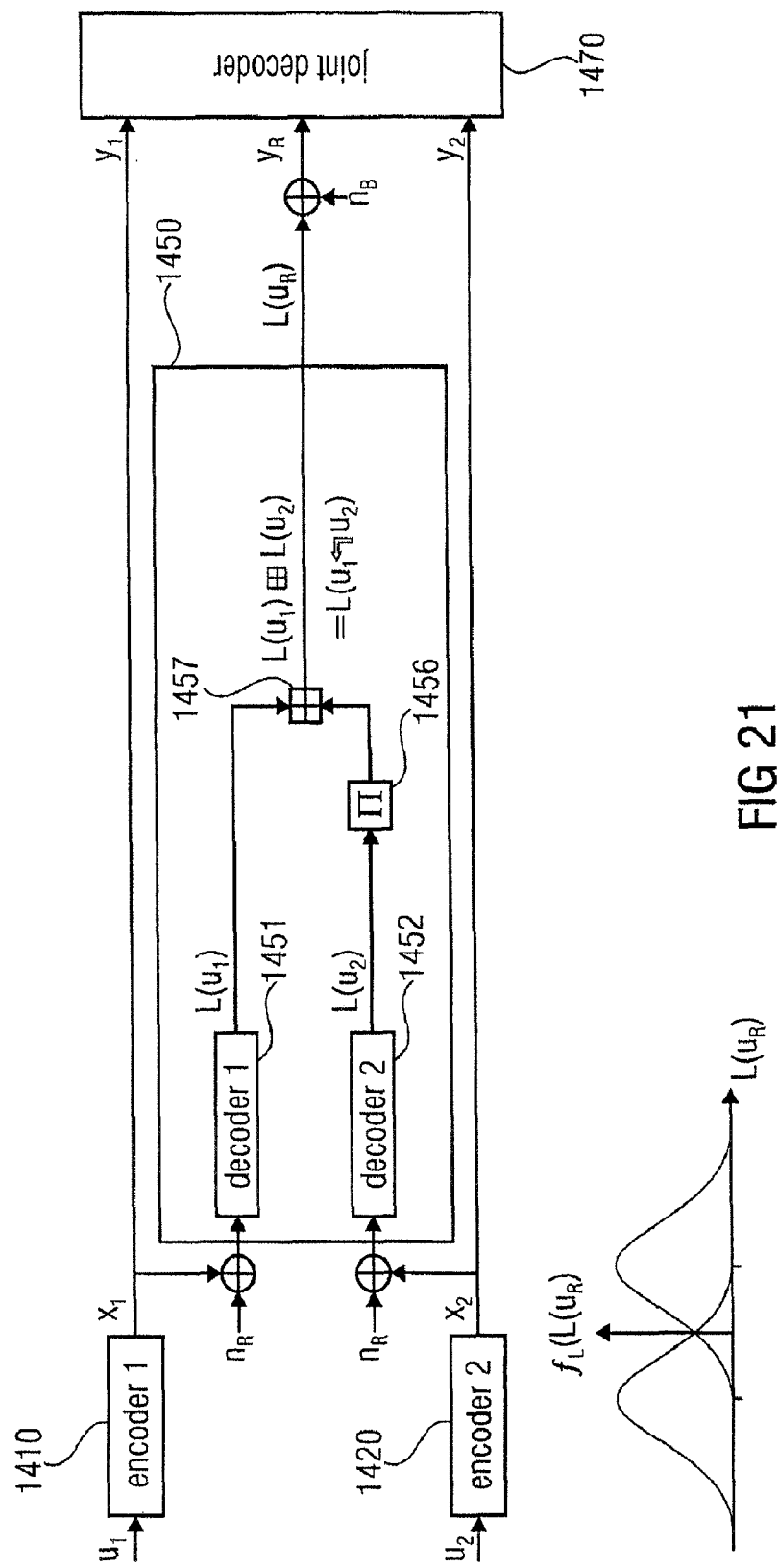
FIG. 21 illustrates another state of the art relaying concept.
Figure 22:
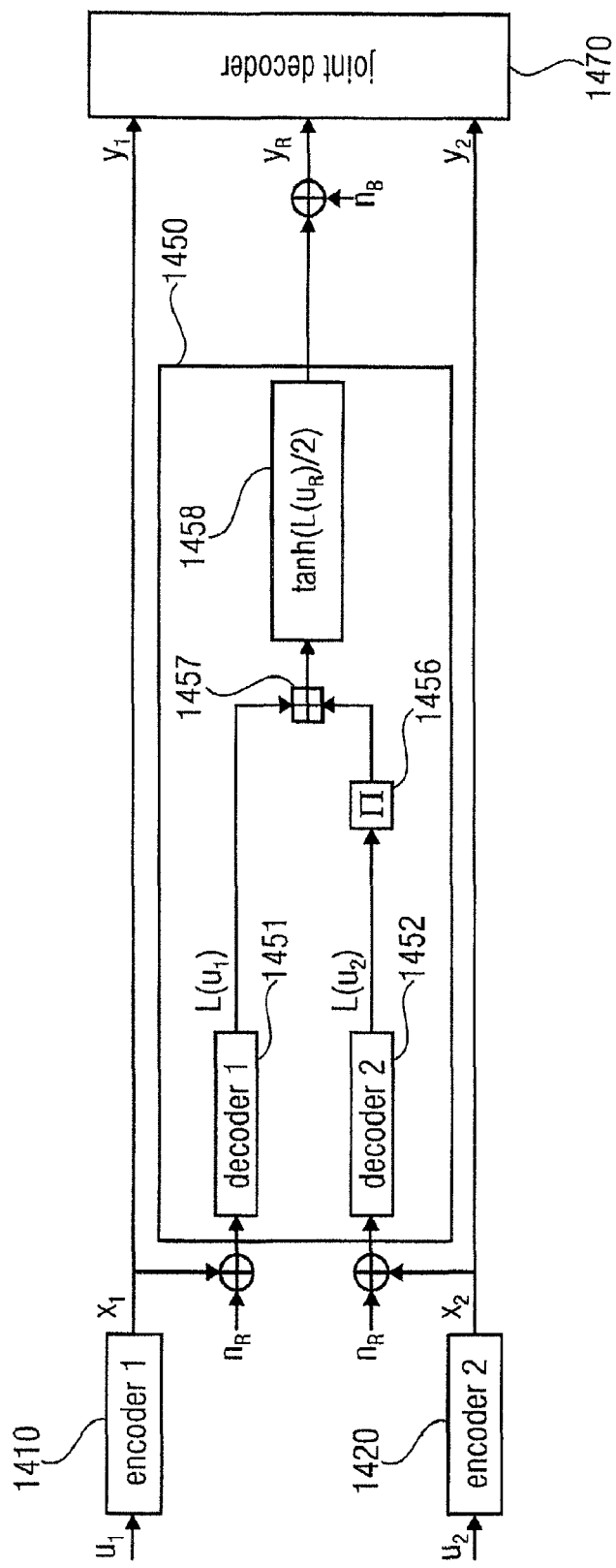
FIG. 22 illustrates another state of the art relaying concept.
Figure 23:
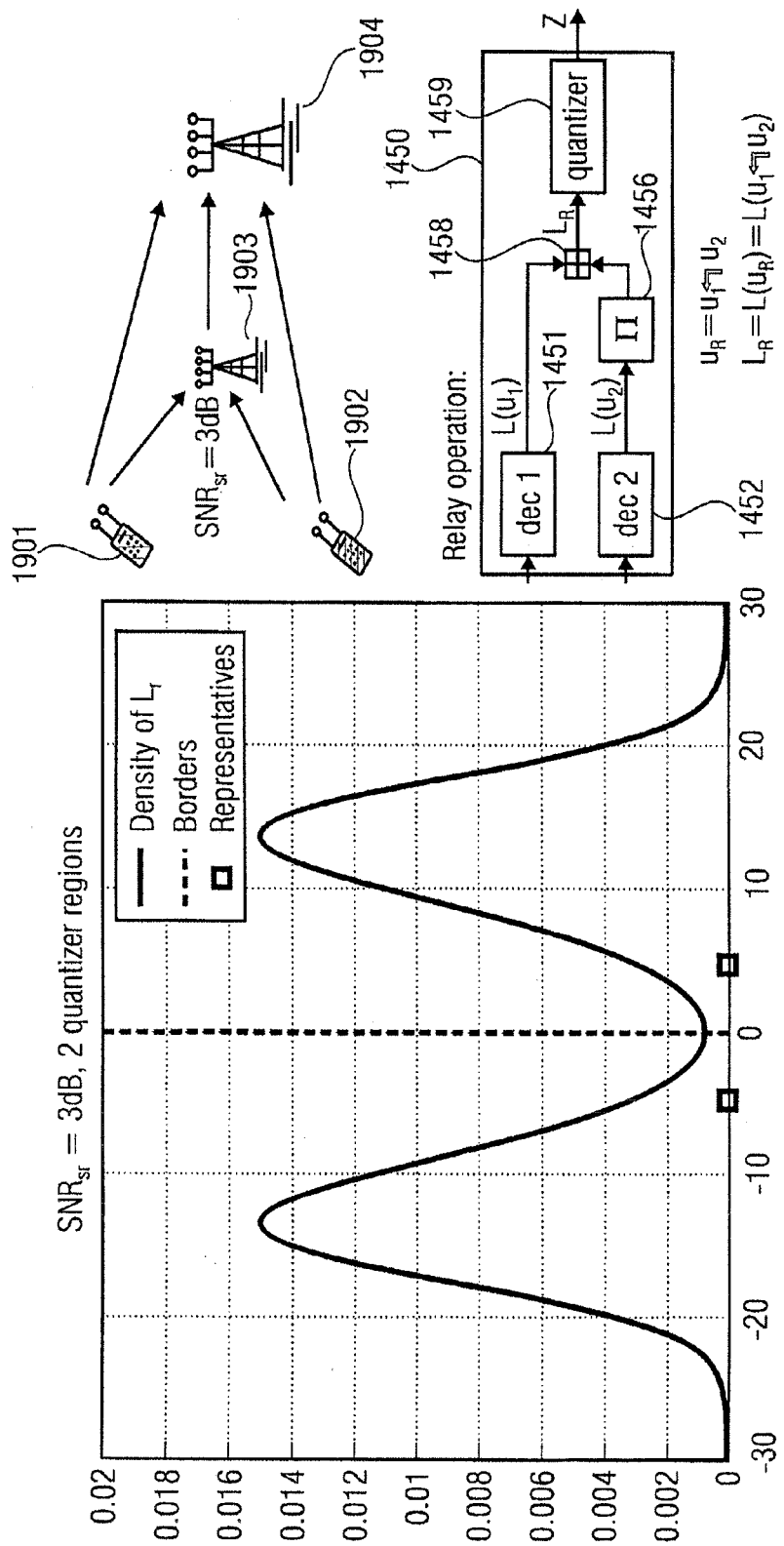
FIG. 23 illustrates a state of the art relaying concept with quantization.
Figure 24:
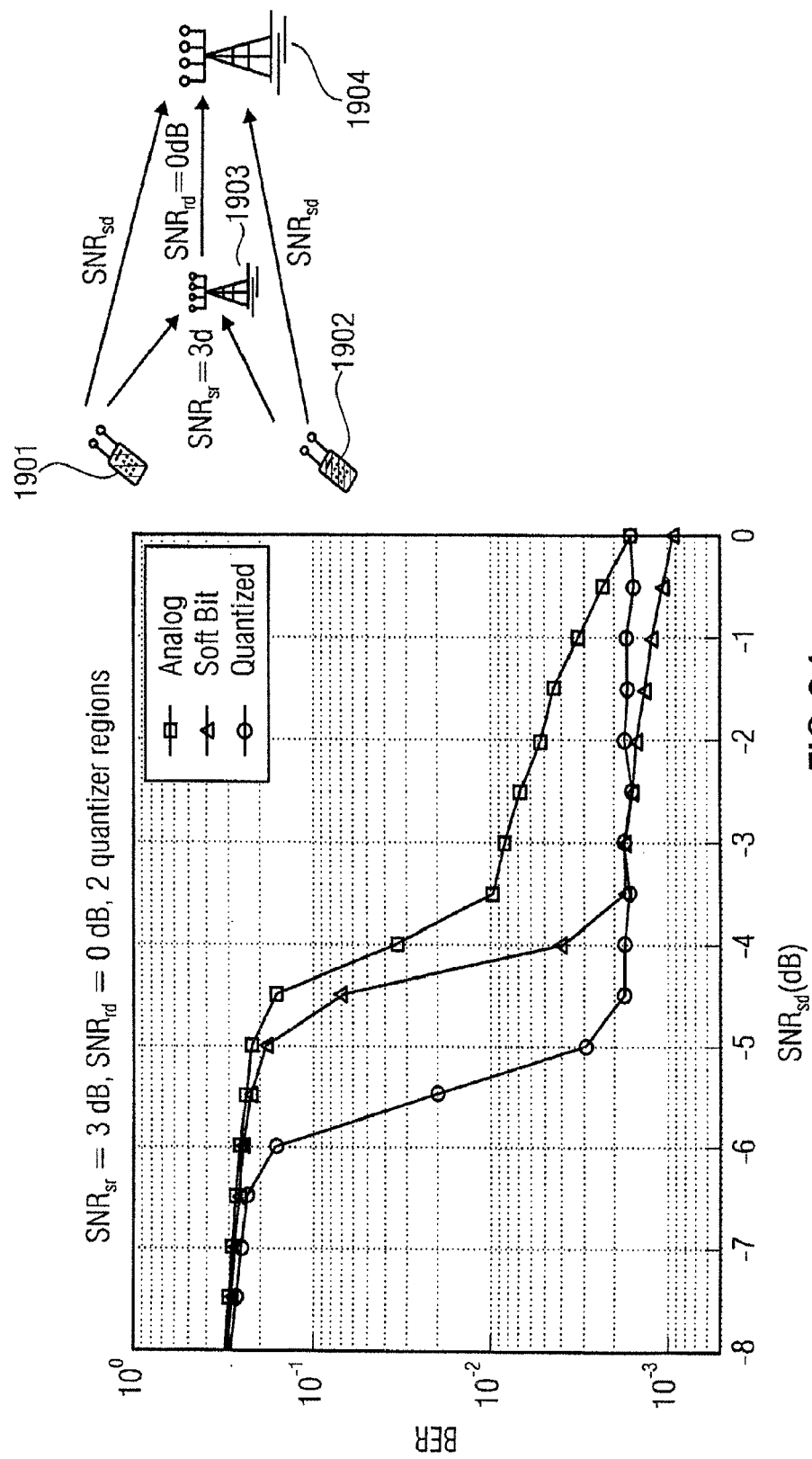
FIG. 24 illustrates simulation results of a state of the art concept.
Figure 25:
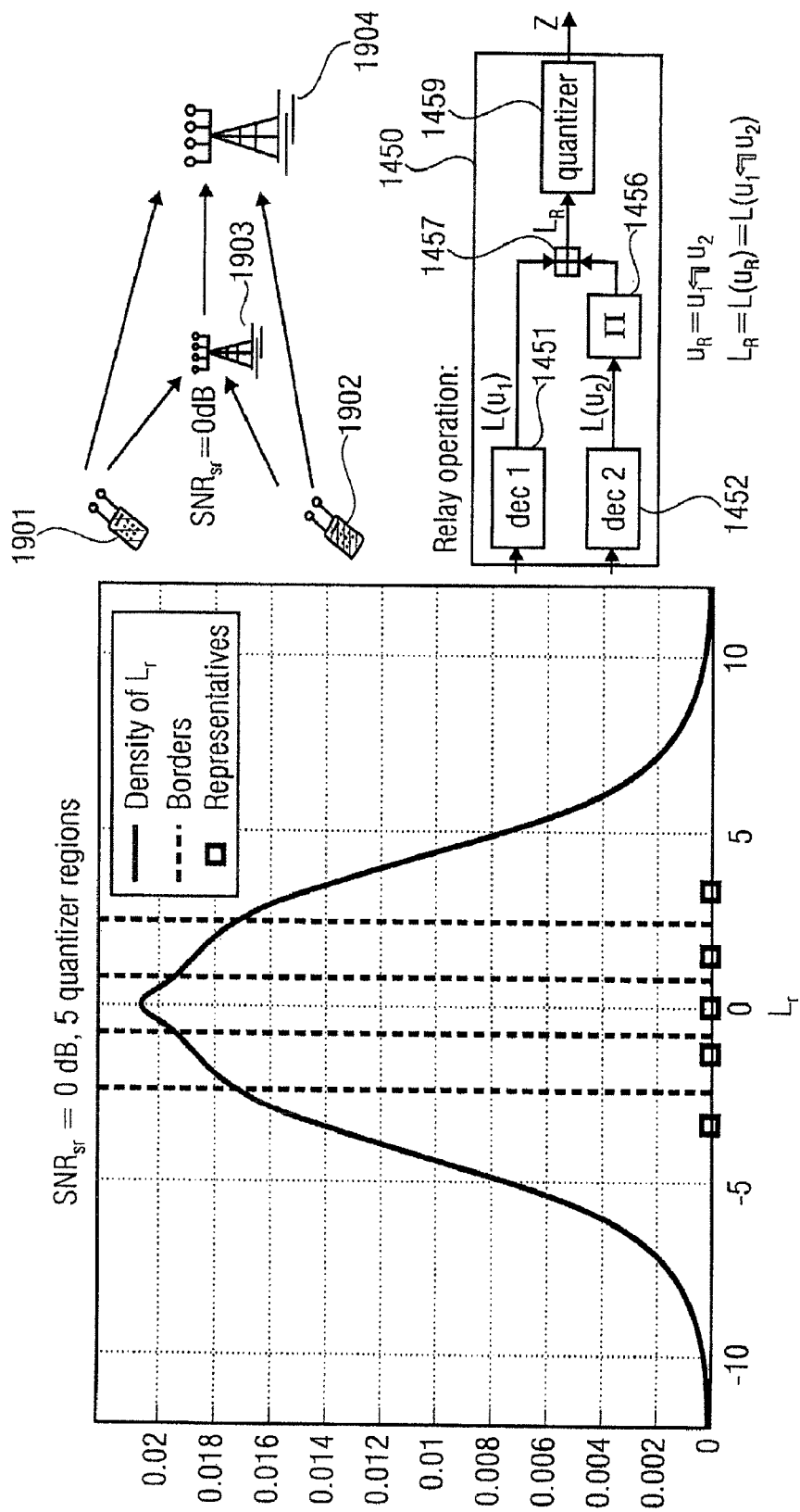
FIG. 25 illustrates another state of the art relaying concept with quantization.
Figure 26:
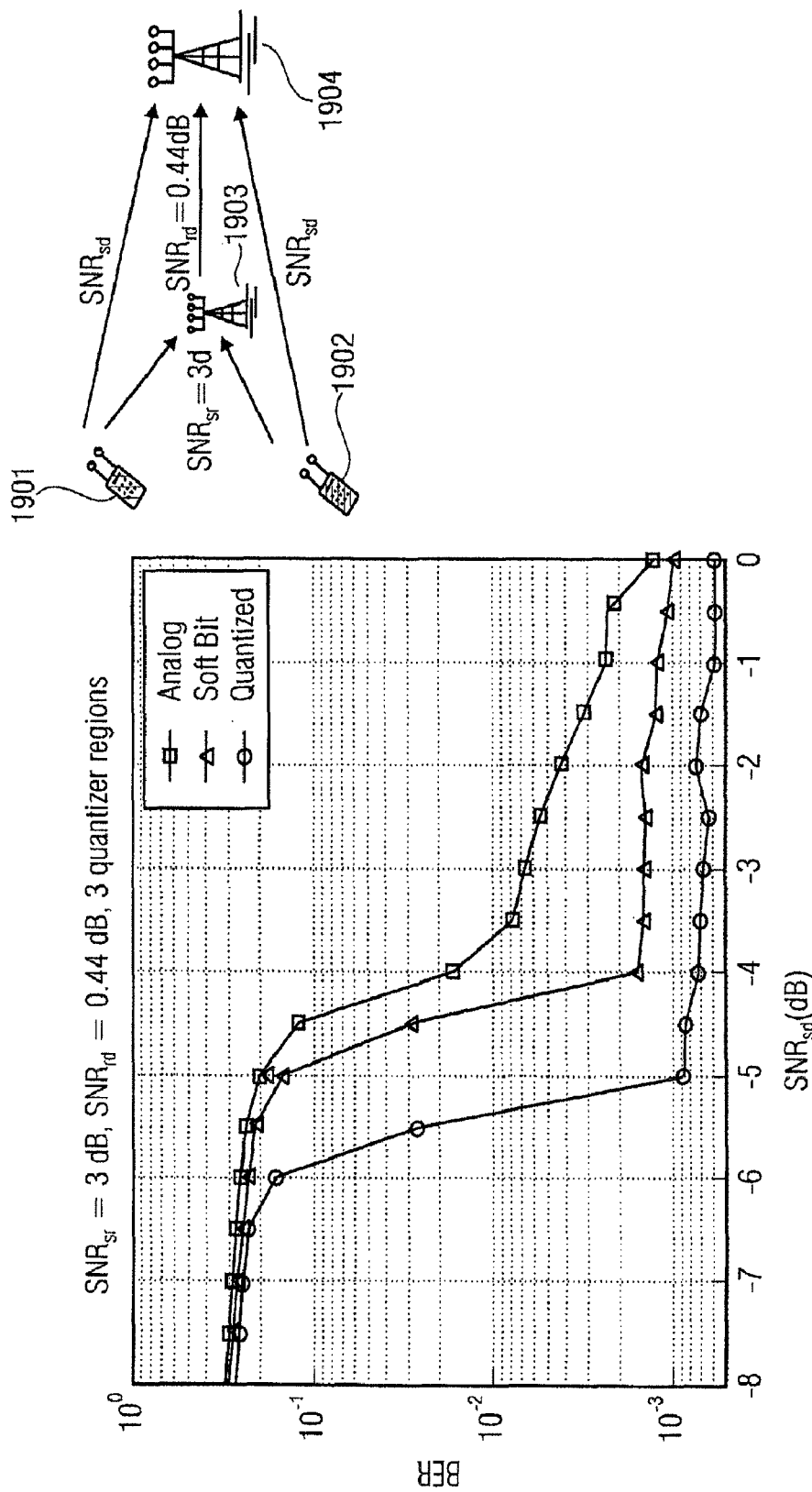
FIG. 26 shows simulation results of state of the art concepts.
Figure 27:
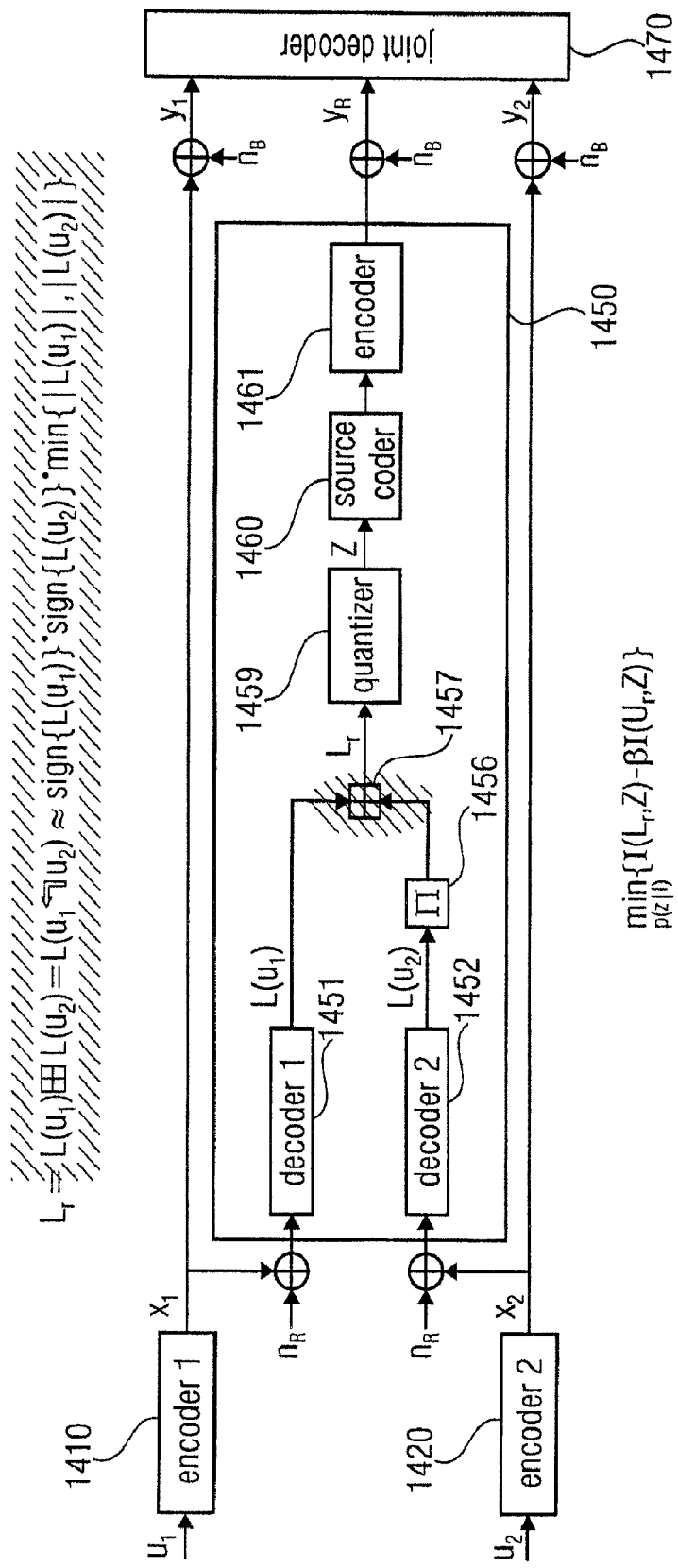
FIG. 27 shows another state of the art relaying concept.
Figure 28:
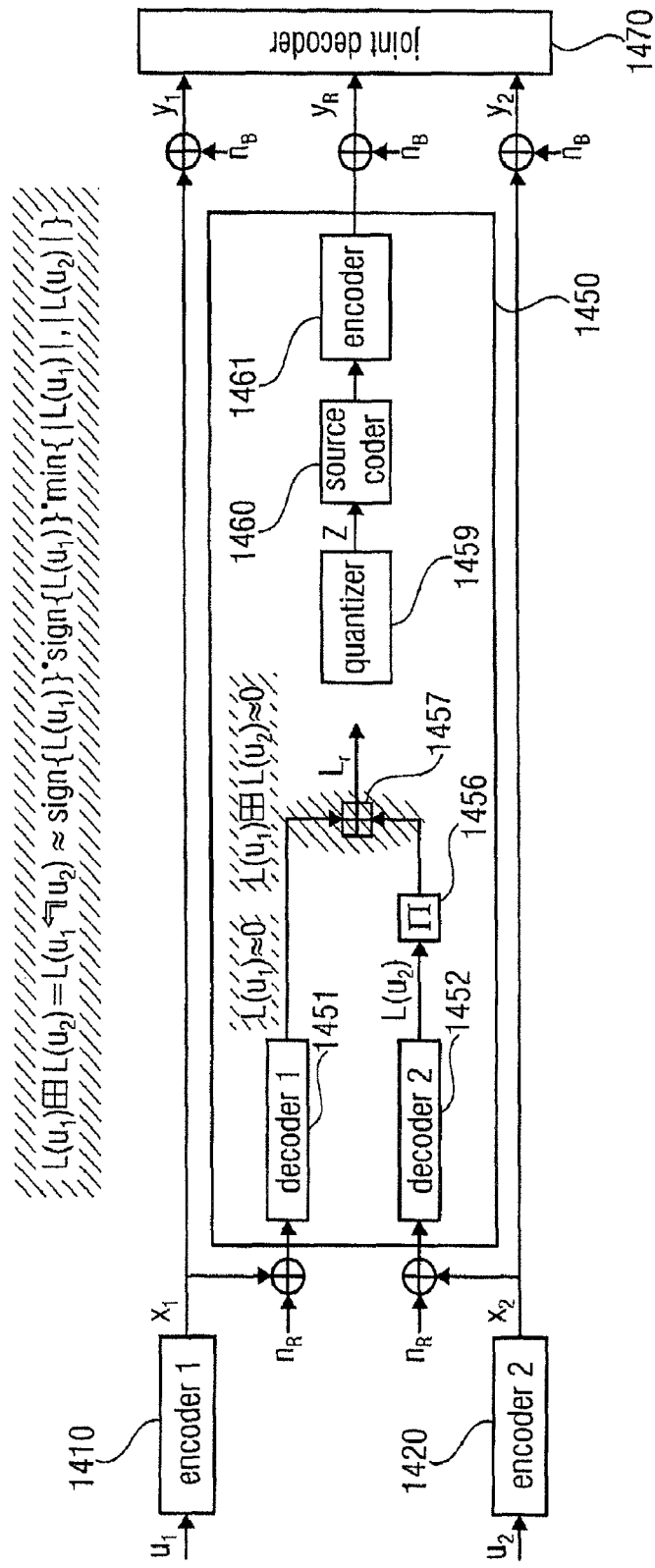
FIG. 28 illustrates another state of the art relaying concept for a weak source to relay station channel.
Figure 29:
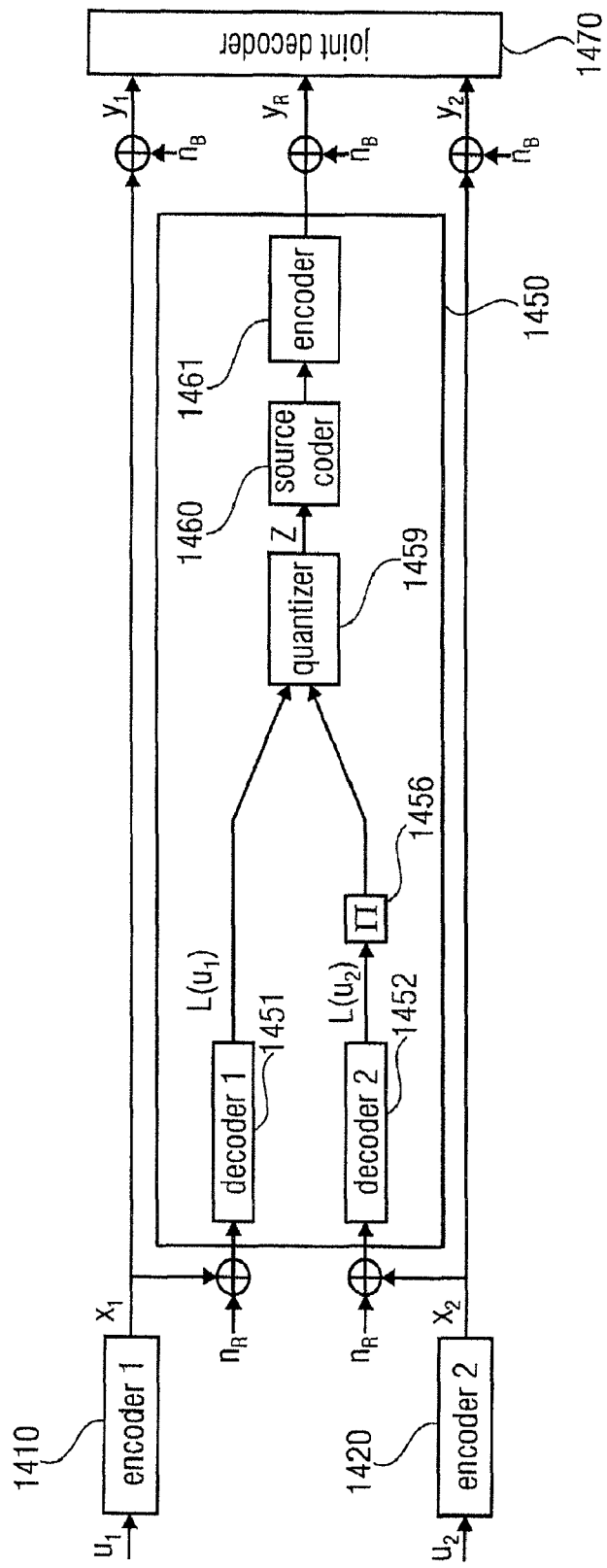
FIG. 29 illustrates another state of the art relaying concept utilizing a quantizer.
Figure 30:
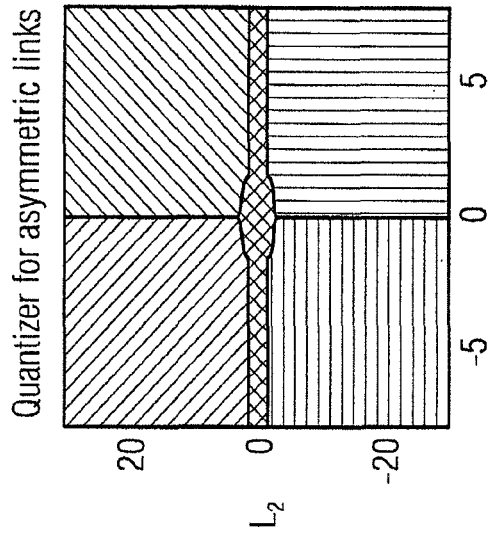
FIG. 30 illustrates quantizer dimensioning for a state of the art relaying concept.
Figure 30:
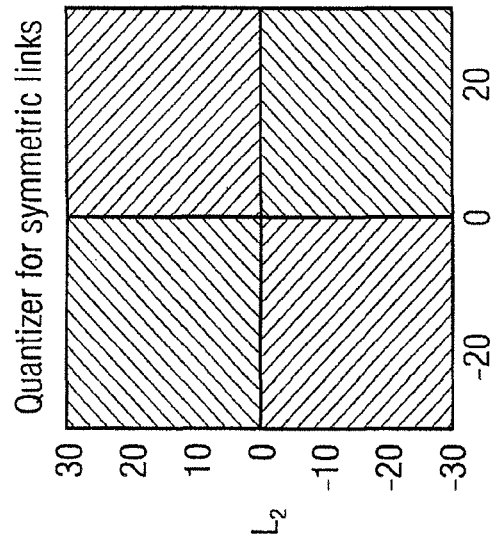

In the following, a derivation of the message passing rules for the general case, as mentioned above, will be provided with the assistance of FIG. 12, one section of a decoding graph was chosen which includes the messages which will be introduced in the following.

Expressions on how LLRs are exchanged are derived by the component codes connected by the function node $p(x_1, x_2 \mid z)$. Some definitions are needed before proceeding. Let $x_{1,m}$ be the m-th element of $x_1$, and let $x'_{2,m}$ be the m-th element of $X'_2$, and assume that $x_{1,m}$ and $x'_{2,m}$ are connected by $p(x_{1,m}, x'_{2,m} \mid z_m)$. Let $\mu_A(x_{1,m})$ and $\mu_E(x'_{2,m})$ be the messages from and to the check node, respectively, as shown in FIG. 12. Further, define $L_{A,m}^{(1)} = \ln(\mu_A(x_{1,m} = 1)/\mu_A(x_{1,m} = -1))$ and $L_{E,m}^{\prime(2)} = \ln(\mu_E(x'_{2,m} = 1)/\mu_E(x'_{2,m} = -1))$. FIG. 12 shows one section of the decoding graph with the corresponding messages.

The message passing rules for function nodes are applied in the following to compute $L_{A,m}^{(1)}$. Since $$\mu_A(x_{1,m}) =$$

$$\sum_{x_2 \in \{+1,-1\}} p(x_{1,m}, x_2, z_m) \mu_E(x_2) = \sum_{x_2 \in \{+1,-1\}} p(x_{1,m}, x_2 \mid z_m) p(z_m) \mu_E(x_2)$$

one obtains $$L_{A,m}^{(1)} == \ln\left(\frac{\mu_A(x_{1,m} = 1)}{\mu_A(x_{1,m} = -1)}\right)$$

$$= \ln\left(\frac{p(x_{1,m} = 1, x'_{2,m} = 1 \mid z_m)\mu_E(x'_{2,m} = 1) +}{p(x_{1,m} = 1, x'_{2,m} = -1 \mid z_m)\mu_E(x'_{2,m} = -1)} \middle/ \frac{p(x_{1,m} = -1, x'_{2,m} = 1 \mid z_m)\mu_E(x'_{2,m} = 1) +}{p(x_{1,m} = -1, x'_{2,m} = -1 \mid z_m)\mu_E(x'_{2,m} = -1)}\right)$$

$$= \ln\left(\frac{1 + \frac{p(x_{1,m} = 1, x'_{2,m} = 1 \mid z_m)\mu_E(x'_{2,m} = 1)}{p(x_{1,m} = 1, x'_{2,m} = -1 \mid z_m)\mu_E(x'_{2,m} = -1)}}{\frac{p(x_{1,m} = 1, x'_{2,m} = -1 \mid z_m)\mu_E(x'_{2,m} = 1)}{p(x_{1,m} = 1, x'_{2,m} = -1 \mid z_m)\mu_E(x'_{2,m} = -1)} + \frac{p(x_{1,m} = -1, x'_{2,m} = -1 \mid z_m)}{p(x_{1,m} = 1, x'_{2,m} = -1 \mid z_m)}}\right)$$

Using the definitions in Eq. (4), one obtains that $$L_{A,m}^{(1)} = \ln\left(\frac{1 + e^{L'^{(2)}_{E,m}} e^{L(x=1, x'_{2,m} \mid z_m)}}{e^{L'^{(2)}_{E,m}} e^{-L(x_{1,m}, x'_{2,m} \mid z_m)} + e^{-L(x_{1,m}, x'_{2,m} = -1 \mid z_m)}}\right).$$

Along the lines of the derivations above, one can also compute $$L_{A,m}^{\prime(2)} = \ln\left(\frac{1 + e^{L^{(1)}_{E,m}} e^{L(x_{1,m}, x'_{2,m} = 1 \mid z_m)}}{e^{L^{(1)}_{E,m}} e^{L(x_{1,m}, x'_{2,m} \mid z_m)} + e^{-L(x_{1,m} = -1, x'_{2,m} \mid z_m)}}\right),$$

where $$L_{A,m}^{\prime(2)} = \ln(\mu_A(x'_{2,m} = 1)/\mu_A(x'_{2,m} = -1))$$

and $$L_{E,m}^{(1)} = \ln(\mu_E(x_{1,m} = 1)/\mu_E(x_{1,m} = -1)).$$

Embodiments of the present invention may utilize the quantizer design framework which was introduced above for the received LLRs at the relay in symmetric AWGN channels using, for example, the IBM. Furthermore, embodiments may extend this method to the general case, i.e. lifting the symmetry requirement on the source-relay channels. Embodiments may, therefore, provide the advantage that efficient processing may be carried out at the relay station for several users jointly. Moreover, low delay may be achieved since no decoding has to be performed at the relay and noise amplification can be avoided.

Depending on certain implementation requirements of the inventive methods, the inventive methods may be implemented in hardware or in software. The implementation can be formed using a digital storage medium, in particular a disc, a DVD or a CD, having an electronically readable control signal stored thereon which cooperates with the programmable computer, such that the inventive methods are performed. Generally, the present invention is therefore a computer program product with a program code for a machine-readable carrier, the program code being operative for performing the inventive methods when the computer program runs on a computer. In other words, the inventive methods are therefore a computer program having a program code for performing at least one of the inventive methods when the computer program runs on a computer.

The invention claimed is:

1. A relay station for being operative in a mobile communication system, comprising:
    a receiver for receiving a radio signal from a source, the radio signal comprising symbols representing an encoded information, the encoded information being based on an encoding rule and comprising payload information and redundancy information, wherein the receiver is adapted for receiving another radio signal from another source, the other radio signal comprising other symbols representing other encoded information, the other encoded information being based on another encoding rule and comprising other payload information and other redundancy information, and wherein the receiver is adapted for providing a signal quality measure for the radio signal and another signal quality measure on the other radio signal;
    a soft detector for detecting a symbol from the radio signal to obtain soft information, the soft information comprising information on the symbol and reliability information on the information on the symbol, wherein the soft detector is adapted for detecting another symbol from the other radio signal to obtain another soft information, the other soft information comprising an information on the other symbol and reliability information on the information on the other symbol;
    a quantizer for quantizing the soft information and the other soft information jointly and/or wherein the quantizer is adapted for quantizing a combination of the soft information and the other soft information to obtain quantized soft information, wherein the quantizer is adapted for quantizing based on a quantization rule and wherein the quantization rule is based on the signal quality measure and on the other signal quality measure and on a transmission capacity between the relay station and a destination, wherein the quantization rule is such that if the signal quality measure indicates a higher signal quality than the other signal quality measure, the quantized soft information comprises a higher share of the transmission capacity for the soft information than for the other soft information; and
    a transmitter for transmitting an information on the quantized soft information to a destination and for the transmitting an information on the quantization rule to the destination.

2. The relay station of claim 1, wherein the soft detector is adapted for obtaining the soft information $L_1$ in terms of an LLR and the other soft information $L_2$ in terms of an LLR, and wherein the quantizer is adapted for quantizing a combination $L_r$ of the soft information and the other soft information in terms of $$L_r = L_1 \boxplus L_2',$$

wherein $L_2'$ is an interleaved version of $L_2$.

3. The relay station of claim 1, wherein the quantization rule is based on an information bottleneck algorithm determining a locally optimized quantization rule based on the signal quality measure, the other signal quality measure, the transmission capacity, and an iteration scope.

4. The relay station of claim 1, wherein the receiver and the transmitter are adapted for receiving and transmitting in a cellular mobile communication system.

5. A method for relaying in a mobile communication system, comprising the steps of
receiving a radio signal from a source, the radio signal comprising symbols representing an encoded information, the encoded information being based on an encoding rule and comprising payload information and redundancy information;
receiving another radio signal from another source, the other radio signal comprising other symbols representing other encoded information, the other encoded information being based on another encoding rule and comprising other payload information and other redundancy information;
providing a signal quality measure for the radio signal and another signal quality measure on the other radio signal;
detecting a symbol from the radio signal to obtain a soft information, the soft information comprising information on the symbol and reliability information on the information on the symbol;
detecting another symbol from the other radio signal to obtain another soft information, the other soft information comprising an information on the other symbol and reliability information on the information on the other symbol;
quantizing the soft information and the other soft information jointly and/or quantizing a combination of the soft information and the other soft information to obtain the quantized soft information, the quantizing being based on a quantization rule, wherein the quantization rule is based on the signal quality measure and/or on the other signal quality measure and/or on a transmission capacity for relaying, wherein the quantization rule is such that if the signal quality measure indicates a higher signal quality than the other signal quality measure, the quantized soft information comprises a higher share of the transmission capacity for the soft information than for the other soft information; and
transmitting an information on the quantized soft information to a destination.

6. A decoder for decoding a first encoded codeword to obtain first soft information on a first code word $x_1$ and a second encoded codeword to obtain second soft information on a second codeword $x_2$, comprising
a first soft decoder for determining the first soft information on the first codeword $x_1$ based on the first encoded codeword, wherein the first soft decoder is adapted for determining the first soft information in terms of an LLR;
a second soft decoder for determining the second soft information on the second codeword $x_2$ based on the second encoded codeword and on second a-priori information $L_A^{(2)}$, wherein the second soft decoder is adapted for determining the second soft information in terms of an LLR;
a first soft information renderer for providing the second a-priori information $L_A^{(2)}$ based on the first soft information and quantized soft information z, the quantized soft information z being based on a joint quantization of the first encoded codeword and the second encoded codeword, wherein the first soft information renderer is adapted for providing the second a-priori information $L_A^{(2)}$ in terms of an LLR and for determining the second a-priori information $L_A^{(2)}$ by a de-interleaved version of $$L'^{(2)}_{A,m} = \ln\left(\frac{1 + e^{L^{(1)}_{E,m}} e^{L(x_{1,m},x'_{2,m}=1|z_m)}}{e^{L^{(1)}_{E,m}} e^{L(x_{1,m},x'_{2,m}|z_m)} + e^{-L(x_{1,m}=-1,x'_{2,m}|z_m)}}\right);$$

wherein m is an index within a word, $x'_2$ being an interleaved version of $x_2$, wherein the quantized soft information z is such that $x_{1,m}$ and $x'_{2,m}$ are associated by the probability density $p(x_{1,m},x'_{2,m}|z_m)$, wherein $L_{E,m}^{(1)}$ is a combination of the first soft information and first a-priori information $L_A^{(1)}$, and wherein $$L(x_{1,m}, x'_{2,m}=1|z_m) = \ln\left(\frac{p(x_{1,m}=1, x'_{2,m}=1|z_m)}{p(x_{1,m}=-1, x'_{2,m}=1|z_m)}\right),$$

$$L(x_{1,m}, x'_{2,m}|z_m) = \ln\left(\frac{p(x_{1,m}=1, x'_{2,m}=-1|z_m)}{p(x_{1,m}=-1, x'_{2,m}=1|z_m)}\right),$$

$$L(x_{1,m}=-1, x'_{2,m}|z_m) = \ln\left(\frac{p(x_{1,m}=-1, x'_{2,m}=1|z_m)}{p(x_{1,m}=-1, x'_{2,m}=-1|z_m)}\right);$$

a second soft information renderer for providing first a-priori information $L_A^{(1)}$ based on the second a-priori information $L_A^{(2)}$, the quantized soft information z and the second soft information, wherein the second soft information renderer is adapted for providing the first a-priori information $L_A^{(1)}$ in terms of an LLR, wherein $$L^{(1)}_{A,m} = \ln\left(\frac{1 + e^{L'^{(2)}_{E,m}} e^{L_m(x_{1,m}=-1,x'_{2,m}|z_m)}}{e^{L'^{(2)}_{E,m}} e^{-L(x_{1,m},x'_{2,m}|z_m)} + e^{-L(x_{1,m},x'_{2,m}=-1|z_m)}}\right),$$

wherein $L_{E,m}'^{(2)}$ is an interleaved version of a combination of the second soft information and the second a-priori information $L_A^{(2)}$ and $$L(x_{1,m}=1, x'_{2,m}|z_m) = \ln\left(\frac{p(x_{1,m}=1, x'_{2,m}=1|z_m)}{p(x_{1,m}=1, x'_{2,m}=-1|z_m)}\right),$$

$$L(x_{1,m}, x'_{2,m}=-1|z_m) = \ln\left(\frac{p(x_{1,m}=1, x'_{2,m}=-1|z_m)}{p(x_{1,m}=-1, x'_{2,m}=-1|z_m)}\right),$$

wherein the first soft decoder is adapted for determining updated first soft information on the first codeword $x_1$ based on the encoded first codeword and the first a-priori information $L_A^{(1)}$.

7. The decoder of claim 6, wherein the first soft information renderer is adapted for providing updated second a-priori information $L_A^{(2)}$ based on the updated first soft information, the first a-priori information $L_A^{(1)}$, and the quantized soft information z.

8. The decoder of claim 6, further comprising a receiver for receiving encoded quantized soft information and a decoder for decoding the encoded quantized soft information and a re-quantizer for providing the quantized soft information based on a quantization rule and the decoded encoded quantized soft information.

9. The decoder of claim 8, wherein the receiver is further adapted for receiving an information on the quantization rule.

10. The decoder of claim 6, wherein the receiver is adapted for operating in a cellular mobile communication system.

11. A method for decoding a first encoded codeword to obtain a first soft information on a first codeword $x_1$ and a second encoded codeword to obtain a second soft information on a second codeword $x_2$, comprising the steps of
  determining the first soft information on the first codeword $x_1$ based on the first encoded codeword in terms of an LLR;
  determining the second soft information on the second codeword $x_2$ based on the second encoded codeword and second a-priori information $L_A^{(2)}$ in terms of an LLR;
  providing the second a-priori information $L_A^{(2)}$ in terms of an LLR based on the first soft information and quantized soft information z, the quantized soft information z being based on a joint quantization of the first encoded codeword and the second encoded codeword and determining the second a-priori information $L_A^{(2)}$ by a de-interleaved version of $$L'^{(2)}_{A,m} = \ln\left(\frac{1 + e^{L'^{(1)}_{E,m}} e^{L(x_{1,m}, x'_{2,m}=1|z_m)}}{e^{L'^{(1)}_{E,m}} e^{L(x_{1,m}, x'_{2,m}|z_m)} + e^{-L(x_{1,m}=-1, x'_{2,m}|z_m)}}\right),$$

wherein m is an index within a word, $x'_{2,m}$ being an interleaved version of $x_{2,m}$, wherein the quantized soft information z is such that $x_{1,m}$ and $x'_{2,m}$ are associated by the probability density $p(x_{1,m}, x'_{2,m}|z_m)$, wherein $L_{E,m}^{(1)}$ is a combination of the first soft information and first a-priori information $L_A^{(1)}$, and wherein $$L(x_{1,m}, x'_{2,m}=1|z_m) = \ln\left(\frac{p(x_{1,m}=1, x'_{2,m}=1|z_m)}{p(x_{1,m}=-1, x'_{2,m}=1|z_m)}\right),$$

$$L(x_{1,m}, x'_{2,m}|z_m) = \ln\left(\frac{p(x_{1,m}=1, x'_{2,m}=-1|z_m)}{p(x_{1,m}=-1, x'_{2,m}=1|z_m)}\right),$$

$$L(x_{1,m}=-1, x'_{2,m}=1|z_m) = \ln\left(\frac{p(x_{1,m}=-1, x'_{2,m}=1|z_m)}{p(x_{1,m}=-1, x'_{2,m}=-1|z_m)}\right);$$

providing first a-priori information $L_A^{(1)}$ in terms of an LLR based on the second a-priori information $L_A^{(2)}$, the quantized soft information z and the second soft information, wherein $$L^{(1)}_{A,m} = \ln\left(\frac{1 + e^{L'^{(2)}_{E,m}} e^{L_m(x_{1,m}=1, x'_{2,m}|z_m)}}{e^{L'^{(2)}_{E,m}} e^{-L(x_{1,m}, x'_{2,m}|z_m)} + e^{-L(x_{1,m} x'_{2,m}=-1|z_m)}}\right),$$

wherein $L_{E,m}'^{(2)}$ is an interleaved version of a combination of the second soft information and the second a-priori information $L_A^{(2)}$ and $$L(x_{1,m}=1, x'_{2,m}|z_m) = \ln\left(\frac{p(x_{1,m}=1, x'_{2,m}=1|z_m)}{p(x_{1,m}=1, x'_{2,m}=-1|z_m)}\right),$$

$$L(x_{1,m}, x'_{2,m}=-1|z_m) = \ln\left(\frac{p(x_{1,m}=1, x'_{2,m}=-1|z_m)}{p(x_{1,m}=-1, x'_{2,m}=-1|z_m)}\right); \text{ and}$$

determining updated first soft information on the first codeword $x_1$ based on the encoded first codeword and the first a-priori information $L_A^{(1)}$.

12. A computer-readable medium, having stored thereon a program having a program code for performing, when the program runs on a computer or processor, a method for relaying in a mobile communication system, the method comprising the steps of receiving a radio signal from a source, the radio signal comprising symbols representing an encoded information, the encoded information being based on an encoding rule and comprising payload information and redundancy information;

receiving another radio signal from another source, the other radio signal comprising other symbols representing other encoded information, the other encoded information being based on another encoding rule and comprising other payload information and other redundancy information;

providing a signal quality measure for the radio signal and another signal quality measure on the other radio signal;

detecting a symbol from the radio signal to obtain a soft information, the soft information comprising information on the symbol and reliability information on the information on the symbol;

detecting another symbol from the other radio signal to obtain another soft information, the other soft information comprising an information on the other symbol and reliability information on the information on the other symbol;

quantizing the soft information and the other soft information jointly and/or quantizing a combination of the soft information and the other soft information to obtain the quantized soft information, the quantizing being based on a quantization rule, wherein the quantization rule is based on the signal quality measure and/or on the other signal quality measure and/or on a transmission capacity for relaying, wherein the quantization rule is such that if the signal quality measure indicates a higher signal quality than the other signal quality measure, the quantized soft information comprises a higher share of the transmission capacity for the soft information than for the other soft information; and transmitting an information on the quantized soft information to a destination.

13. A system comprising a relay station and a decoder for decoding a first encoded codeword to obtain first soft information on a first code word $x_1$ and a second encoded codeword to obtain second soft information on a second codeword $x_2$, wherein the relay station comprises:
  a receiver for receiving a radio signal from a source, the radio signal comprising symbols representing an encoded information, the encoded information being based on an encoding rule and comprising payload information and redundancy information, wherein the receiver is adapted for receiving another radio signal from another source, the other radio signal comprising other symbols representing other encoded information, the other encoded information being based on another encoding rule and comprising other payload information and other redundancy information, and wherein the receiver is adapted for providing a signal quality measure for the radio signal and another signal quality measure on the other radio signal;
  a soft detector for detecting a symbol from the radio signal to obtain soft information, the soft information comprising information on the symbol and reliability information on the information on the symbol, wherein the soft detector is adapted for detecting another symbol from the other radio signal to obtain another soft information, the other soft information comprising an information on the other symbol and reliability information on the information on the other symbol;

a quantizer for quantizing the soft information and the other soft information jointly and/or wherein the quantizer is adapted for quantizing a combination of the soft information and the other soft information to obtain quantized soft information, wherein the quantizer adapted for quantizing based on a quantization rule and wherein the quantization rule is based on the signal quality measure and on the other signal quality measure and on a transmission capacity between the relay station and a destination, wherein the quantization rule is such that if the signal quality measure indicates a higher signal quality than the other signal quality measure, the quantized soft information comprises a higher share of the transmission capacity for the soft information than for the other soft information; and a transmitter for transmitting an information on the quantized soft information to a destination and for transmitting an information on the quantization rule to the destination, and wherein the decoder comprises:

a first soft decoder for determining the first soft information on the first codeword $x_1$ based on the first encoded codeword, wherein the first soft decoder is adapted for determining the first soft information in terms of an LLR;

a second soft decoder for determining the second soft information on the second codeword $x_2$ based on the second encoded codeword and on second a-priori information $L_A^{(2)}$, wherein the second soft decoder is adapted for determining the second soft information in terms of an LLR;

a first soft information renderer for providing the second a-priori information $L_A^{(2)}$ based on the first soft information and quantized soft information z, the quantized soft information z being based on a joint quantization of the first encoded codeword and the second encoded codeword, wherein the first soft information renderer is adapted for providing the second a-priori information $L_A^{(2)}$ in terms of an LLR and for determining the second a-priori information $L_A^{(2)}$ by a de-interleaved version of $$L_{A,m}^{\prime(2)} = \ln\left(\frac{1 + e^{L_{E,m}^{(1)}} e^{L(x_{1,m}, x_{2,m}^{\prime}=1|z_m)}}{e^{L_{E,m}^{(1)}} e^{L(x_{1,m}, x_{2,m}^{\prime}|z_m)} + e^{-L(x_{1,m}=-1, x_{2,m}^{\prime}|z_m)}}\right),$$

wherein m is an index within a word, $x_2^{\prime}$ being an interleaved version of $x_2$, wherein the quantized soft information z is such that $x_{1,m}$ and $x_{2,m}^{\prime}$ are associated by the probability density $p(x_{1,m}, x_{2,m}^{\prime}|z_m)$, wherein $L_{E,m}^{(1)}$ is a combination of the first soft information and first a-priori information $L_A^{(1)}$, and wherein $$L(x_{1,m}, x_{2,m}^{\prime} = 1|z_m) = \ln\left(\frac{p(x_{1,m}=1, x_{2,m}^{\prime}=1|z_m)}{p(x_{1,m}=-1, x_{2,m}^{\prime}=1|z_m)}\right),$$

$$L(x_{1,m}, x_{2,m}^{\prime}|z_m) = \ln\left(\frac{p(x_{1,m}=1, x_{2,m}^{\prime}=-1|z_m)}{p(x_{1,m}=-1, x_{2,m}^{\prime}=1|z_m)}\right),$$

$$L(x_{1,m}=-1, x_{2,m}^{\prime}|z_m) = \ln\left(\frac{p(x_{1,m}=-1, x_{2,m}^{\prime}=1|z_m)}{p(x_{1,m}=-1, x_{2,m}^{\prime}=-1|z_m)}\right);$$

a second soft information renderer for providing first a-priori information $L_A^{(1)}$ based on the second a-priori information $L_A^{(2)}$, the quantized soft information z and the second soft information, wherein the second soft information renderer is adapted for providing the first a-priori information $L_A^{(1)}$ in terms of an LLR, wherein $$L_{A,m}^{(1)} = \ln\left(\frac{1 + e^{L_{E,m}^{\prime(2)}} e^{L_m(x_{1,m}=1, x_{2,m}^{\prime}|z_m)}}{e^{L_{E,m}^{\prime(2)}} e^{-L(x_{1,m}, x_{2,m}^{\prime}|z_m)} + e^{-L(x_{1,m}, x_{2,m}^{\prime}=-1|z_m)}}\right),$$

wherein $L_{E,m}^{\prime(2)}$ is an interleaved version of a combination of the second soft information and the second a-priori information $L_A^{(2)}$ and $$L(x_{1,m}=1, x_{2,m}^{\prime}|z_m) = \ln\left(\frac{p(x_{1,m}=1, x_{2,m}^{\prime}=1|z_m)}{p(x_{1,m}=1, x_{2,m}^{\prime}=-1|z_m)}\right),$$

$$L(x_{1,m}, x_{2,m}^{\prime}=-1|z_m) = \ln\left(\frac{p(x_{1,m}=1, x_{2,m}^{\prime}=-1|z_m)}{p(x_{1,m}=-1, x_{2,m}^{\prime}=-1|z_m)}\right),$$

wherein the first soft decoder is adapted for determining updated first soft information on the first codeword $x_1$ based on the encoded first codeword and the first a-priori information $L_A^{(1)}$.

14. A computer-readable medium having stored thereon a computer program having a program code for performing, when the program runs on a computer or processor, a method for decoding a first encoded codeword to obtain a first soft information on a first codeword $x_1$ and a second encoded codeword to obtain a second soft information on a second codeword $x_2$, the method comprising the steps of determining the first soft information on the first codeword $x_1$ based on the first encoded codeword in terms of an LLR;

determining the second soft information on the second codeword $x_2$ based on the second encoded codeword and second a-priori information $L_A^{(2)}$ in terms of an LLR;

providing the second a-priori information $L_A^{(2)}$ in terms of an LLR based on the first soft information and quantized soft information z, the quantized soft information z being based on a joint quantization of the first encoded codeword and the second encoded codeword and determining the second a-priori information $L_A^{(2)}$ by a de-interleaved version of $$L_{A,m}^{\prime(2)} = \ln\left(\frac{1 + e^{L_{E,m}^{(1)}} e^{L(x_{1,m}, x_{2,m}^{\prime}=1|z_m)}}{e^{L_{E,m}^{(1)}} e^{L(x_{1,m}, x_{2,m}^{\prime}|z_m)} + e^{-L(x_{1,m}=-1, x_{2,m}^{\prime}|z_m)}}\right),$$

wherein m is an index within a word, $x_{2,m}^{\prime}$ being an interleaved version of $x_{2,m}$, wherein the quantized soft information z is such that $x_{1,m}$ and $x_{2,m}^{\prime}$ are associated by the probability density $p(x_{1,m}, x_{2,m}^{\prime}|z_m)$, wherein $L_{E,m}^{(1)}$ is a combination of the first soft information and first a-priori information $L_A^{(1)}$, and wherein $$L(x_{1,m}, x_{2,m}^{\prime} = 1|z_m) = \ln\left(\frac{p(x_{1,m}=1, x_{2,m}^{\prime}=1|z_m)}{p(x_{1,m}=-1, x_{2,m}^{\prime}=1|z_m)}\right),$$

-continued $$L(x_{1,m}, x'_{2,m} | z_m) = \ln\left(\frac{p(x_{1,m} = 1, x'_{2,m} = -1 | z_m)}{p(x_{1,m} = -1, x'_{2,m} = 1 | z_m)}\right),$$

$$L(x_{1,m} = -1, x'_{2,m} | z_m) = \ln\left(\frac{p(x_{1,m} = -1, x'_{2,m} = 1 | z_m)}{p(x_{1,m} = -1, x'_{2,m} = -1 | z_m)}\right);$$

providing first a-priori information $L_A^{(1)}$ in terms of an LLR based on the second a-priori information $L_A^{(2)}$, the quantized soft information z and the second soft information, wherein $$L_{A,m}^{(1)} = \ln\left(\frac{1 + e^{L_{E,m}'^{(2)}} e^{L_m(x_{1,m}=1, x'_{2,m}|z_m)}}{e^{L_{E,m}'^{(2)}} e^{-L(x_{1,m}, x'_{2,m}|z_m)} + e^{-L(x_{1,m} x'_{2,m}=-1|z_m)}}\right),$$

wherein $L_{E,m}'^{(2)}$ is an interleaved version of a combination of the second soft information and the second a-priori information $L_A^{(2)}$ and $$L(x_{1,m} = 1, x'_{2,m} | z_m) = \ln\left(\frac{p(x_{1,m} = 1, x'_{2,m} = 1 | z_m)}{p(x_{1,m} = 1, x'_{2,m} = -1 | z_m)}\right),$$

$$L(x_{1,m}, x'_{2,m} = -1 | z_m) = \ln\left(\frac{p(x_{1,m} = 1, x'_{2,m} = -1 | z_m)}{p(x_{1,m} = -1, x'_{2,m} = -1 | z_m)}\right); \text{ and}$$

determining updated first soft information on the first codeword $x_1$ based on the encoded first codeword and the first a-priori information $L_A^{(1)}$.

\* \* \* \* \*